(12) United States Patent
Taylor et al.

(10) Patent No.: US 6,256,676 B1
(45) Date of Patent: Jul. 3, 2001

(54) AGENT-ADAPTER ARCHITECTURE FOR USE IN ENTERPRISE APPLICATION INTEGRATION SYSTEMS

(75) Inventors: John Timothy Taylor, Leesburg; Hon-Siew Yee, Herndon, both of VA (US)

(73) Assignee: SAGA Software, Inc., Reston, VA (US)

( * ) Notice: Subject to any disclaimer, the term of this patent is extended or adjusted under 35 U.S.C. 154(b) by 0 days.

(21) Appl. No.: 09/412,595

(22) Filed: Oct. 5, 1999

Related U.S. Application Data

(60) Provisional application No. 60/108,993, filed on Nov. 18, 1998.

(51) Int. Cl.⁷ ........................................ G06F 13/00
(52) U.S. Cl. .................................................. 709/246
(58) Field of Search ..................... 709/200, 206, 709/217, 218, 226, 228, 230, 231, 232, 236, 243, 246; 707/10

(56) References Cited

U.S. PATENT DOCUMENTS 5,680,551 * 10/1997 Martino, II ..................... 709/243

* cited by examiner

*Primary Examiner*—Robert Harrell
(74) *Attorney, Agent, or Firm*—Venable; James R. Burdett

(57) ABSTRACT

An agent-adapter architecture used in systems and methods to integrate applications of the type normally deployed across a networked enterprise. A plurality of adapters, each of which is adapted to perform a discrete function associated with respective ones of the plurality of enterprise applications is encapsulated by an agent. The agent is extensible, including one or more embedded objects, each of which is adapted to perform a discrete function that may or may not be associated with respective ones of the plurality of enterprise applications.

51 Claims, 15 Drawing Sheets

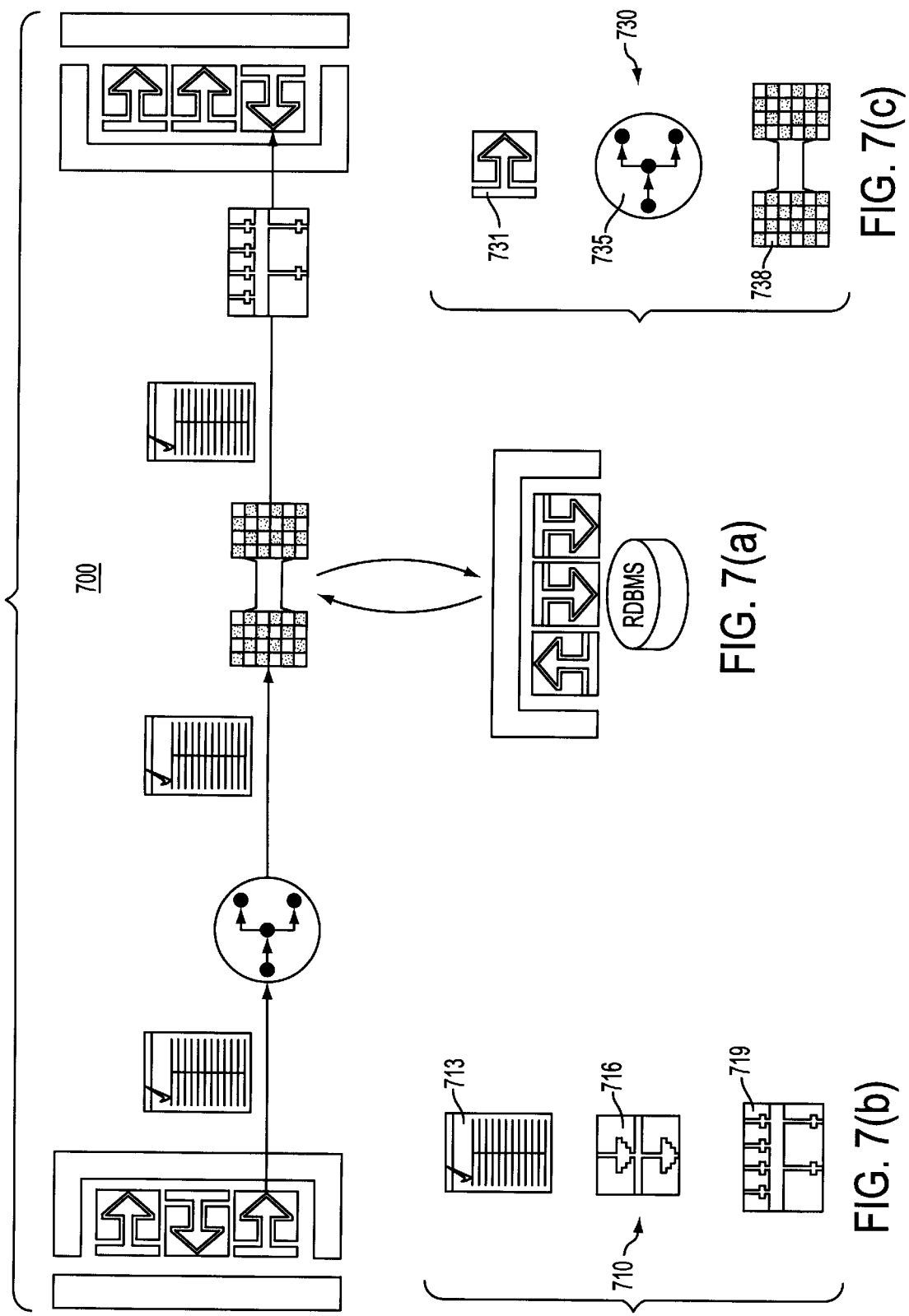

AGENT-ADAPTER ARCHITECTURE FOR USE IN ENTERPRISE APPLICATION INTEGRATION SYSTEMS

CROSS-REFERENCE TO RELATED APPLICATIONS

This application is related to provisional patent application Serial No. 60/108,993, filed Nov. 18, 1998, the contents of which are incorporated herein by reference.

This application is also related to the following co-pending, commonly assigned patent applications filed concurrently herewith: Ser. No. 09/412,633, for a "Message Object for Use in Enterprise Application Integration Systems", and Ser. No. 09/412,596, for an "Extensible Distributed Enterprise Application Integration System", both of which are incorporated herein by reference.

COPYRIGHT NOTICE

Portions of the disclosure of this patent document may contain material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention is related generally to what has become known in the computing arts as "middleware", and more particularly to a unique agent-adapter architecture used in systems and methods to integrate applications of the type normally deployed across a networked enterprise.

2. Statement of the Prior Art

According to one observer, if the lifeblood of today's corporations is information, then their arteries are the "inter-application interfaces" that facilitate movement of data around the corporate enterprise. This has more recently become known as an "application network".

For the typical organization, the application network has grown organically into a collection of ad hoc application integration programs. This menagerie has had a very serious impact on businesses as it increases the time for implementing new applications, prevents senior management from getting a clear picture of the business and, in short, clogs the corporate arteries. In spite of the fact that application integration has become crucial to a competitive corporation's survival, it has nevertheless been acceptable in the prior art to handcraft or "hack" custom code for such purposes at enormous long-term cost to the corporation. Long-term application integration decisions have, likewise, been made at the lowest possible levels based solely on individual project criteria. Because of the decidedly difficult nature of these problems, an effective enterprise application integration (EAI) solution has yet to be found.

The advent of the Internet, client/server computing, corporate mergers and acquisitions, globalization and business process re-engineering, have together forced corporate information technology (IT) departments to continually seek out new, and often manual, ways to make different systems talk to each other—regardless of how old some of those systems may be. In the ensuing chaos, inadequate communications systems have had a debilitating effect on IT's abilities to move as fast as the business needs it to.

Recent trends in IT have only exacerbated this problem by increasing—often by an order of magnitude—the amount of inter-application interfacing needed to support them. Most recently, enterprise applications have performed such functions as data warehousing and enterprise resource planning (ERP), and facilitated electronic commerce. A brief review of these three technologies would, therefore, be helpful in understanding the long-felt but as yet unresolved need for EAI.

Data warehousing techniques require large volumes of clean historical data that must be moved, on a regular basis, from many operational systems into the warehouse. Source data is usually structured for online transactional processing (OLTP), while the typical data warehouse also accommodates online analytical processing (OLAP) formats. Therefore, the source data must undergo extensive aggregation and reformatting as it is transferred to the warehouse.

A typical data warehouse according to the prior art is populated in four steps: (a) extracting the source data; (b) cleaning such extracted data; (c) aggregating the cleaned, extracted data in a number of dimensions; and (d) loading the warehouse. Each warehouse source requires the building of a specific data extraction, cleansing, aggregation, and load routine. Forrester Research estimates that the average large company has approximately four data warehouses. In two years, it is expected that this number will grow to six. The average amount of data contained in each warehouse is also expected to double in size in that same period—from about 130 gigabytes to about 260 gigabytes.

The problems associated with such large amounts of data growing at an ever-increasing pace is exacerbated by the quality of source data. According to a study conducted by the META Group, typical data warehouses are being loaded today with as much as 20% poor quality data. That same study indicates that about 70% of its respondents used extraction, cleansing and loading processes that were coded by hand. With respect to the required aggregation processes, anecdotal evidence also reveals that as much as 50 hours of computer time may be required to complete this function alone. It is readily apparent that significant maintenance efforts would be involved with programs coded in such a manner.

On the other hand, typical ERP systems (such as the R/3 enterprise application developed by SAP AG of Walldorf, Germany, as well as those developed by PeopleSoft, Oracle, and Baan) are essentially large, integrated packaged applications that support core business functions, such as payroll, manufacturing, general ledger, and human resources. Large corporations find it particularly attractive to buy such software solutions from a single source, since it can cost between 10 to 20 times more to develop the same functionality in-house than to purchase it. Implementing an ERP system, however, can be an overwhelming process for a number of reasons.

First and foremost, the corporation is buying a product and not building a solution. This means that business units within the corporation must adapt to the product and how it works, not the other way around. Furthermore, today's ERP systems cannot replace all of a corporation's custom solutions. They must, therefore, communicate effectively with other legacy systems in place. Finally, it is not atypical for a corporation to employ more than one and completely different ERP system because a single vendor cannot usually meet every organizational need.

As a result, the options for getting data into and out of an ERP system preclude known approaches used for data warehousing. Each ERP system has a proprietary data model that is constantly being enhanced by its vendor. Writing extract or load routines that manipulate such models is not only complicated, but is also discouraged by the vendor since data validation and business rules inherent in the enterprise application are likely to be bypassed. Instead, ERPs require interaction at the business object level which deals with specific business entities such as general ledgers, budgets or accounts payable. Further details regarding implementation and use of one well-known and widely accepted ERP system may be found in *Special Edition Using SAP R/3* (2d ed.), ISBN: 0-7897-1351-9, by Que Corporation (1997), the contents of which are incorporated herein by reference.

Electronic commerce in one form or another has been around for many years. In essence, it got its start with electronic data interchange (EDI). EDI permitted companies to communicate their purchase orders and invoices electronically, and continued to develop such that today's companies use EDI for supply chain management. However, not until the more recent exploding use of online Internet websites to buy, sell, and even auction, items of interest has there been such a dire need for robust, effective EAI. See, e.g., U.S. Pat. No. 5,627,972.

Applications get developed in order to accomplish a specific business objective in a measured time frame. In a typical large organization, different teams of people using a wide assortment of operating systems, DBMSs and development tools develop hundreds of applications. In each case, the specific requirements are satisfied without regard for integration with any other applications.

Several powerful trends are driving the market for application integration. For example, significant developments in peer-to-peer networking and distributed processing have made it possible for businesses to better integrate their own functional departments as well as integrate with their partners and suppliers. The aforementioned Internet/"intranet"/ "extranet" explosion is also fueling the demand for a new class of "human active" applications that require integration with back-end legacy applications. Tremendous growth around the world in the adoption of enterprise application software packages (e.g., SAP R/3) also requires integration with back-end legacy applications. Finally, message oriented middleware (MOM)—products such as IBM's MQSeries message queuing product—are becoming increasingly popular. Once customers realize the benefits of simple one-to-one application connectivity with MOM, their interest in many-to-many application integration increases significantly.

As the need for businesses to integrate grows, the number of IT dollars spent on integrating applications is increasing rapidly. According to various industry analysts, the need for "mission critical" application integration will drive the combined market for MOM and "message brokers" to grow from $300 million in 1997 to over $700 million in 1999. According to an IBM survey of larger customers, nearly 70% of all code written today consists of interfaces, protocols and other procedures to establish linkages among various systems. Savvy IT executives can clearly see the dollar savings to be gained by acquiring off-the-shelf software to satisfy as much of this requirement as possible.

A message broker is a software hub that records and manages the contracts between publishers (i.e., senders) and subscribers (i.e., receivers) of messages. When a business event takes place, the application will publish the message (s) corresponding to that business event. The broker reviews its lists of subscriptions and activates delivery to each subscriber for that message type. Subscribers receive only the data to which they subscribe. A message published by one application can be subscribed to by multiple consumer applications. Similarly, a subscribing application can receive messages from multiple publishing applications.

Before applications can publish or subscribe to messages, they must register their interest with the broker. There are two basic and different methods for applications to register interest in a message type—subject-based addressing and message-content filtering. In subject-based addressing, the broker uses the subject to identify and route the message to all parties expressing interest in that subject. The subject is a word used to describe the contents of the message. For example, a subject of the name "hr. emp. new," could serve to distribute information (name, address, employee number, etc.) on a newly hired employee. In message content routing, on the other hand, subscriptions are made based on the contents of fields within the message. The subscriptions can be based upon the message type and/or specific selection criteria relative to a field within the message. For example, a loan approval application could subscribe to all purchase orders over $100,000.

One advantage to having two publish/subscribe paradigms is that the need to address messages to individual subscribing applications is avoided. Additionally, new subscribing applications can be added without any changes to the publishing application.

The typical publishing/subscribing broker uses a robust delivery vehicle for the actual distribution of messages between applications. As mission critical messages travel over a combination of external and internal networks, the systems software ensures that messages are never lost or duplicated in the event of network failures. More often than not, an asynchronous message delivery capability is provided which uses store-and-forward message queuing. In this paradigm, the queue-to-queue transfer takes place in pseudo-real time when the subscribing application is available. If the subscribing application is unavailable, the message is stored in a persistent queue for later delivery.

To be effective, the message delivery vehicle must include a business transaction coordination function. A business transaction is typically made up of several units of work. Each and every unit of work must complete in order for the transaction to occur. If even one unit of work fails, the whole transaction fails, and all completed units of work must then be reversed. These transactions are long running and require message-based updates to multiple databases. The business transaction coordination function provides this managerial support.

Two other important components are the rules-based engine and the data-transformation component. The business rules engine allows organizations to process messages based upon the unique requirements of their business. Typically, business rules engines provide a visual front end to avoid the need for programming in a procedural language. With this flexible approach, changes in business processes can be easily reflected in a modified rules configuration.

The data transformation component is used to develop application-specific adapters. These adapters convert the data formats and applications semantics from the sending application to the receiving application. There are many conversion requirements. They range from basic data transformation to resolving the incompatibilities that exist between the structure (syntax), meaning (semantics) and timing of the information that must be shared.

There are two main strategies for application adapters according to the prior art. One strategy is to convert all of the source data and synchronize (or "sync") applications to a standard canonical form. Messages move from the source adapter to the sync adapter in this standard form. At the sync adapter, the messages are converted to the format of the sync application.

The second strategy for application adapters is to automatically convert the format and semantics from the sending application to the receiving application in one step, without any intermediate formats. In this approach, only one adapter is required for two applications to communicate with each other and it can be integrated with either of the applications.

The rules based engine and the data transformation component work together to reconcile the differences between applications. For example, before two applications can be integrated around an order, the business rules regarding the processing of orders must be defined within each system. Within Application "A," an order might be comprised of a collection of data from multiple files and databases; whereas within Application "B," an order might exist as an individual message nested within a larger file of business transactions. The difficult challenge is to resolve the incompatibilities between the structure of the data and the underlying content of an order as defined in each application.

There are a number of potential business benefits that message brokering provides. First of all is their ease of application integration. With message brokers, the integration of new applications with existing legacy or third-party applications can be performed in a shorter period of time. The integration can take place without any need for understanding the internal structure and design of each application. By focusing on the interface as messages, existing applications can be integrated with minimal disruption.

Support for electronic commerce is a second benefit that message brokering provides. As businesses begin to automate the supply chain of their vendors and partners, there is a need for their independent applications to communicate in a loosely coupled manner. This is precisely the essence and strength of message brokering. The message broker is completely congruent with the business need.

Last, but certainly not least, is message brokering's support for continued heterogeneity. As new technology has evolved, new architectures have been developed and heterogeneity is increasing over time. A methodology such as message brokering is designed to accommodate today's heterogeneous world and will be useful in the future. New, differing applications can be added over time as either publishers or subscribers, without any changes to the existing applications in the message broker.

In summary, message brokers have the potential to provide a least-common-denominator approach to integrating heterogeneous applications within an enterprise. Users can choose the best technology for each individual application whether JAVA, ACTIVE X, or CORBA, without concern for how that application will integrate with other applications in the enterprise. Message brokers thereby bridge the gap between applications of the future and the disparate and complex products and technologies that currently exist in today's application catalogues.

While there are many benefits to adopting a message broker strategy, it must be kept in mind that there are also potential pitfalls. The very strengths of the message brokering in terms of its loose coupling flexibility, may also be its greatest weakness. The nature of message broker software, as noted above, is very generalized. Because it is designed to handle so many different conditions, testing all possible end-to-end code paths is an insurmountable task. When undetected bugs exist in the software, messages may be lost, delivered twice or delayed. The damage from such "accidents" would be most keenly felt in enterprises where message brokers are used to integrate mission critical transaction processing applications. In financial transactions, for example, the delivery of one single message could be worth millions of dollars; while at the same time its non-delivery or delayed delivery could result in the loss of millions.

A second risk to a message broker implementation is the possibility that foreign applications will introduce unauthorized messages to the broker. This may also result in loss. For example, in the banking industry, counterfeit messages could be published and thereby cause the withdrawal or misappropriation of funds.

A third risk of message broker implementation is the classical, "single point of failure." Message brokers of the prior art are typically implemented in a "hub and spoke" architecture. This means that the majority of message traffic passes through a few central hubs. In the event of an outage or a physical disaster to one of those hubs, the mission critical operations of a business could come to a grinding halt.

Another problem with distributed hubs is the difficulty of managing the message broker complex. Because a message broker integrates so many different business applications into a few consolidated hubs, the talent and expertise required to manage and administer a message broker complex may be unattainable.

The potential risk exposure is large whenever technology is applied to mission critical transaction processing applications of an enterprise. One problem for message brokering is that it manipulates mission critical information. In relative terms, message brokering is fairly new. However, while some early adopter companies have had great success with the concept of message brokering, much more is needed before message brokers and EAI can enter the mainstream.

In the 1980's software systems development concentrated on the ability of heterogeneous systems to communicate with each other. This was, in large part, due to the proliferation of proprietary communication protocols. Any newly developed system had to either comply with the application and data formats in place for the systems with which it wished to connect or communicate, or provide such application a specific translation. Accordingly, all software was customized to a greater or lesser degree.

In today's rapidly changing environment, the concerted efforts of thousands of developers worldwide are focused on developing a system that satisfies the need for disparate applications to communicate with each other, without the necessity of embedding multiple, customized application-specific translation schemes. This as yet unfulfilled need is grounded in the imperative of the global economy.

SUMMARY OF THE INVENTION

Accordingly, it is a general object of the present invention to provide systems and method for integrating enterprise applications, which at the same time provide comprehensive management, including centralized monitoring, operation and configuration.

It is a more specific object of the present invention to provide, with a unique agent-adapter architecture, for improved message tracking and manipulation in such systems and methods.

Another object of the present invention is to provide enhanced security in such systems and methods, covering such aspects as authentication, authorization, privacy, non-repudiation, and auditing.

Still another object of the present invention is to provide systems and method for integrating enterprise applications that include means for disaster recovery, fail-safe rollover, message replay and dual-site logging.

It is also an overall object of the present invention to facilitate fast and simple integration of leading ERP applications, custom/legacy applications, packaged applications, and databases. More specifically, it is also an object of the present invention to reduce or substantially eliminate the need for the expensive custom coding that is traditionally required to integrate applications.

Another object of the present invention is to provide an EAI system with a distributed architecture that facilitates the long-term reliability, scalability, flexibility, and extensibility needed by today's enterprises.

Still another object of the present invention is to provide an EAI system which increases an enterprise's return on investment by enabling the enterprise to leverage its existing IT investments, increase its speed to market, implement solutions and realize benefits more quickly, and reduce its operational costs.

Yet another object of the present invention is to provide an EAI system which provides faster access to an enterprise's customer and billing information so that the enterprise can service its customers more effectively and efficiently, creating stronger, more effective relationships.

A further object of the present invention is to provide an EAI system with many-to-many points of integration that substantially eliminates the concerns of conventional hub-and-spoke systems and their single-point-of-failure risks.

Still a further object of the present invention is to provide an EAI system, which simplifies the enterprise IT architecture by providing a central point of integration for virtually all applications and platforms.

Yet a further object of the present invention is to provide an EAI system which provides efficient and cost effective information sharing.

The methods, apparatus, and articles of manufacture described herein will achieve the above and other objects, advantages, and novel features according to the present invention, while avoiding the problems described herein above.

In accordance with a first important aspect of the present invention, the method comprises computer-implemented means for passing messages between a first computer application and a second computer application. Such method generally includes the steps of: (a) providing a first message having a first data structure from the first computer application; (b) publishing the first message to obtain a first published message; (c) converting the first data structure of the first published message to a second data structure to obtain a second message; (d) publishing the second message to obtain a second published message; and (e) providing the second published message to the second computer application.

According to a second important aspect of the present invention, the apparatus comprises a system for integrating a plurality of computer applications. Such apparatus generally includes means for routing messages within the system; means for storing a plurality of data transformation configurations and a plurality of rules; means for applying the data transformation configurations to messages; means for applying the rules to messages; and means for routing messages between the means for routing messages within the system and the computer applications and having dedicated means for routing messages for respective computer applications.

Alternatively, the apparatus of the present invention comprises a system for integrating a plurality of computer applications. Such system generally includes an enterprise messaging system that passes messages between the computer applications; a database storage system, coupled to the enterprise messaging system, that stores a plurality of data transformation configurations and a plurality of rules; an integration service, also coupled to the enterprise messaging system and comprising a data transformation engine using the data transformation configurations stored in the database storage system and a rules evaluation engine using the rules stored in the database storage system; and a plurality of agent-adapters, further coupled to the enterprise messaging system with each agent-adapter coupled to a respective one of the computer applications to pass messages between the enterprise messaging system and the respective computer application.

In accordance with a third important aspect of the present invention, the article of manufacture comprises a computer-readable medium embodying code segments for integrating a plurality of computer applications. Such code segments generally include: (a) a first code segment for passing messages between the computer applications; (b) a second code segment for performing data transformation of messages; (c) a third code segment for applying rules to messages; and (d) a plurality of fourth code segments, each of which passes messages between respective computer applications and the first code segment.

The apparatus of the invention also includes a computer programmed with software to operate the computer in accordance with the invention. Non-limiting examples of a "computer" in this regard include: a general purpose computer; an interactive television; a hybrid combination of a general purpose computer and an interactive television; and any apparatus comprising a processor, memory, the capability to receive input, and the capability to generate output.

The article of manufacture of the invention comprises a computer-readable medium embodying code segments to control a computer to perform the invention. Non-limiting examples of a "computer-readable medium" in this regard include: a magnetic hard disk; a floppy disk; an optical disk, such as a CD-ROM, a CD-R, a CD-RW, or one using DVD standards; a magnetic tape; a memory chip; a carrier wave used to carry computer-readable electronic data, such as those used in transmitting and receiving electronic mail or in accessing a network, such as the Internet or a local area network ("LAN"); and any storage device used for storing data accessible by a computer. Non-limiting examples of "code segments" include computer programs, instructions, objects, software, or any means for controlling a computer.

Other novel and equally important aspects of the present invention will become more apparent from a detailed description thereof, when considered in conjunction with the following drawings wherein:

BRIEF DESCRIPTION OF THE DRAWINGS

FIG. 7(a) is a block diagram showing an integration flow according to the present invention;

FIGS. 7(b) and 7(c) illustrate design and integration objects used in the system according to the present invention;

DETAILED DESCRIPTION OF THE INVENTION

Figure 1A:
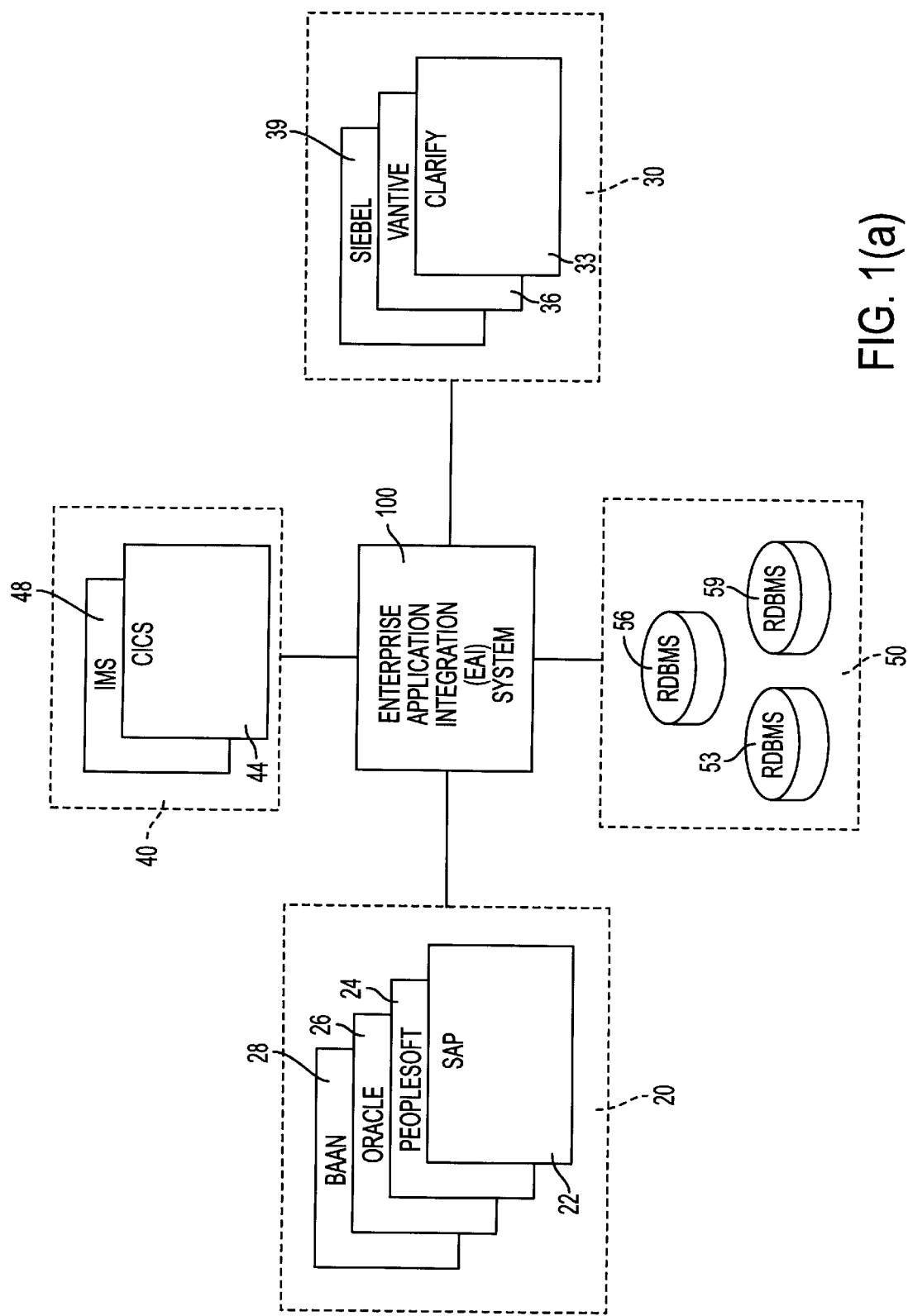
FIG. 1(a) depicts an enterprise application integration (EAI) system according to the present invention, as it is incorporated within an environment including legacy systems, packaged software applications, and relational database management systems.

Referring now to the drawings, wherein like reference characters or numerals designate like or corresponding parts throughout each of the several views, there is shown in FIG. 1(a) a simplistic view of an enterprise computing runtime environment 10. Typical runtime environments 10 use a plurality of packaged software applications, including "back-office" applications 20 for enterprise resource planning (ERP) and "front-office" applications 30 for customer relationship management (CRM), one or more customized legacy systems 40, and one or more multi-dimensional/relational database management systems (RDBMS) 50.

Throughout the past few decades, business enterprises have designed or bought many large, single-purpose software applications. These "legacy" applications continue to be used, and most often were designed to perform a specific function (e.g., inventory, finance, accounting, sales force automation, and human resources). More recently, substantial investments have also been made by those same enterprises to procure packaged software applications from software developers such as SAP, PeopleSoft, Oracle, and Baan. Each of these packaged software applications enjoyed its own unique strengths. Accordingly, the typical business enterprise used two or more disparate packaged software applications in the same runtime environment. Such packaged software applications were not, in the beginning, designed to share information among themselves. As a result, enterprises had been forced to integrate their disparate packaged software applications with expensive custom code. Such integration efforts often took months, if not years, to complete.

Enterprise application integration (EAI) systems, such as the system 100 shown in FIG. 1(a), therefore, became a necessity. However, unlike EAI systems according to the prior art, system 100 comprises a solutions-oriented middleware, which facilitates its users to modify and fully integrate information residing within disparate applications through a single, common infrastructure. It allows the user to move information seamlessly, transparently, and quickly among employees, customers, and suppliers, to achieve maximum productivity.

In such a manner, the system 100 provides a reliable store-and-forward messaging system, a capable message brokering facility, and a strong agent-adapter architecture for integrating disparate enterprise applications. It is distributable, designed for easy administration and management, and is targeted to the complete, heterogeneous computing requirements of a large organization. It intelligently links various applications so they can access and share information. It is middleware that adapts to applications, rather than forcing applications to adapt to it.

System 100 solves most EAI problems by enabling its users to link ERP applications 20, packaged applications 30, custom and legacy applications 40, and databases 50 throughout the enterprise, with minimal custom coding. When fully integrated, an enterprise can quickly synchronize global businesses and divisions and respond to ever changing market demands. With faster access to customer and billing information, the user's organization can service customers more effectively and efficiently, creating stronger, more effective relationships.

The system 100 is a business-centric enterprise integration solution, with an integration flow design environment that targets the business analyst. The analyst defines the problem in business terms, and the product handles the technical issues.

Figure 1B:
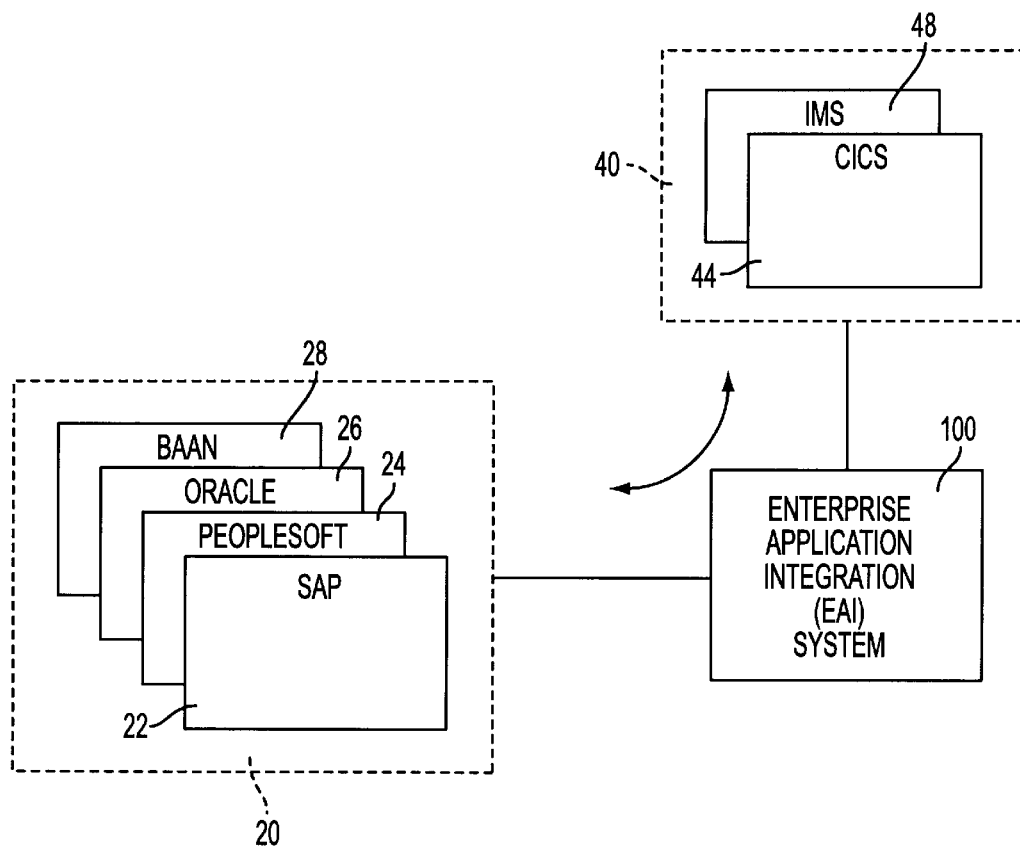
FIG. 1(b) illustrates a first scenario in which the system that is shown in FIG. 1(a) is used to integrate an enterprise resource planning (ERP) packaged software application with custom legacy systems.

For example, as shown in FIG. 1(b), the common scenario of enterprise resource planning (ERP) integration with custom legacy systems demands that the organization encapsulate complex processes properly within standard ERP implementations—not an easy thing to do. Many corporations choose to implement packaged applications for standard business processes such as inventory and order management. But packaged applications are seldom used for vertical processes. For these purposes, the system 100 is ideal. It provides object interfaces for the ERP systems 22, 24, 26, 28, as well as wrapper-generation technology for linking to legacy systems 44, 48.

Figure 1C:
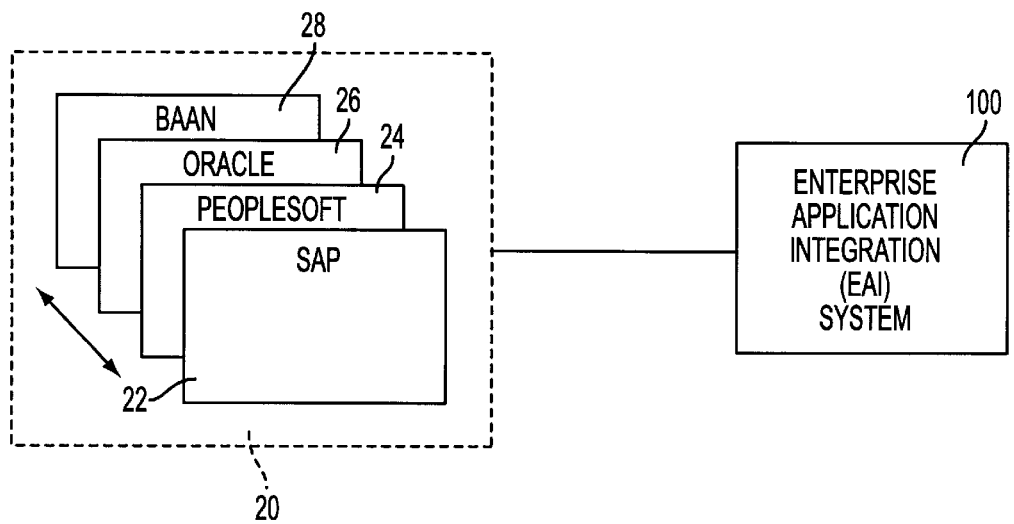
FIG. 1(c) illustrates a second scenario in which the system that is shown in FIG. 1(a) is used to integrate two or more disparate ERP packaged software applications.

The extension of the global supply chain also requires that middleware bridge two or more disparate ERP systems 22, 24, 26, 28. As illustrated in FIG. 1(c), it can be readily appreciated that nothing may be more important to a business-to-business collaboration. The system 100, thus, plays a key role by enabling inter-ERP transactions in which business events in one system (e.g., SAP system 22) invoke corresponding events in another system (e.g., Baan system 28) without exposing the details of the underlying technology.

Figure 1D:
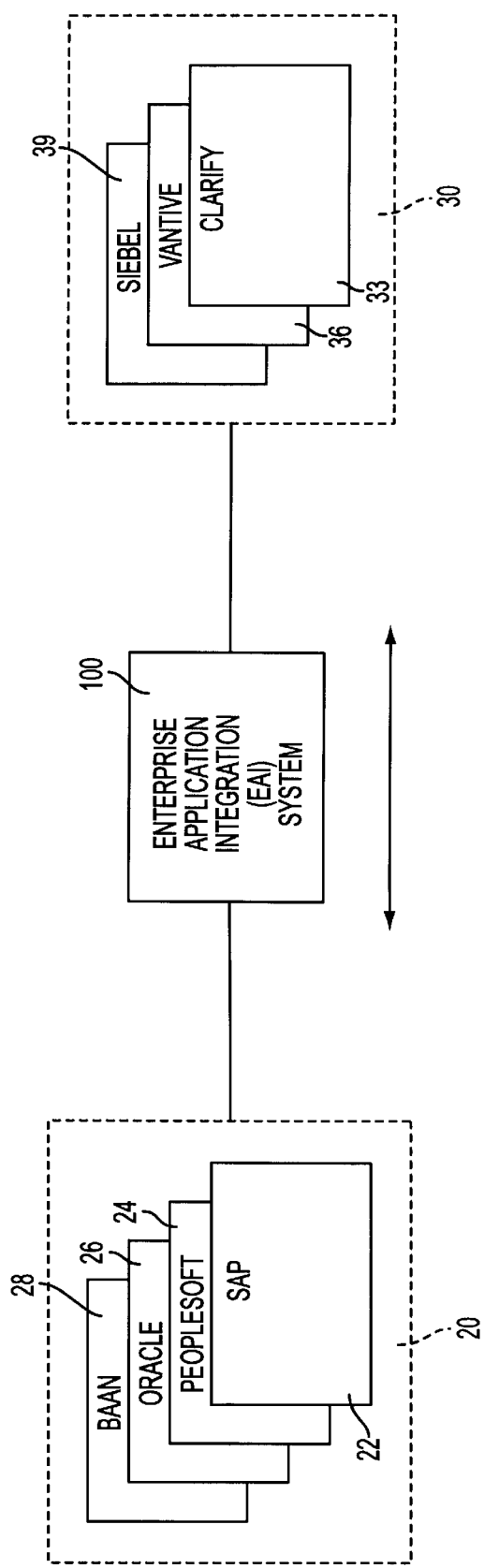
FIG. 1(d) illustrates a third scenario in which the system that is shown in FIG. 1(a) is used to integrate one or more front-office packaged software applications with one or more back-office packaged software applications.

Integration of a corporation's "front-office" with its "back-office" is an important function, which allows front-office applications that interact with the customer to collaborate with back-end production applications. For example, and referring now to FIG. 1(d), it is critically important that customer-support systems collaborate with ERP inventory modules. System 100, thus, facilitates integration of best-of-breed front-office and back-office applications seamlessly and transparently.

Figure 1E:
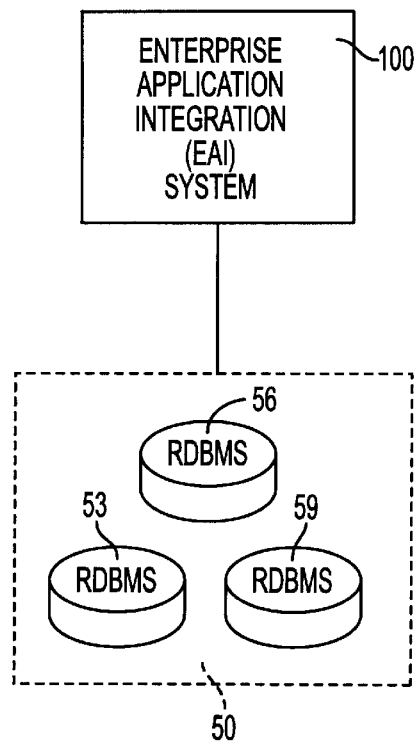
FIG. 1(e) illustrates a fourth scenario in which the system that is shown in FIG. 1(a) is used to integrate data warehouse software applications using two or more disparate relational database management systems (RDBMS) or multi-dimensional database management systems.

In the data warehouse scenario as shown in FIG. 1(e), data from disparate systems must migrate to a central data warehouse or repository. Moving real-time information from several ERP systems (not shown in FIG. 1(e)) to a central relational or multi-dimensional database containing a plurality of different databases 53, 56, 59 is exemplary of this problem. However, data warehouse developers can leverage the data translation services of system 100, as is described in greater detail herein below, for real-time data aggregation or other operations. Data is, thereby translated into an understandable and meaningful condition.

Figure 2:
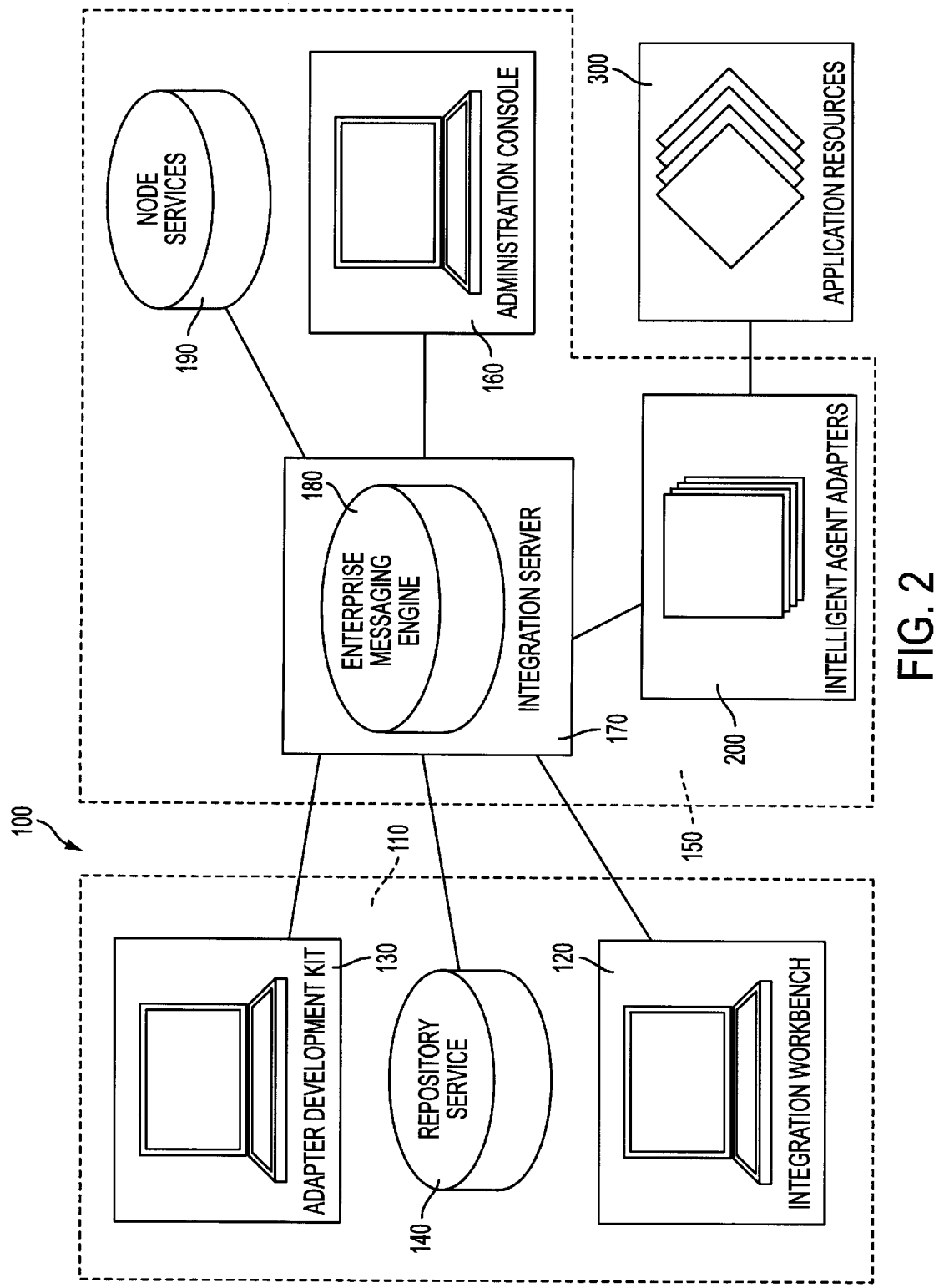
FIG. 2 is a block diagram of the EAI system that is shown in FIGS. 1(a) through 1(e)

As illustrated in FIG. 2, system 100 generally comprises a plurality of design components 110 and a plurality of runtime management components 150. The design components 110, in turn, more specifically comprise an integration workbench 120, an adapter development kit (ADK) 130, and a repository service 140. The runtime management components 150, in turn, more specifically comprise an administration console 160, an integration server 170, including an enterprise messaging engine 180, a node services component 190, a plurality of intelligent agent-adapters 200.

The integration workbench 120 generally comprises a graphical modeling and configuration tool for integration project development. It is used to define events, those messages associated with such events, integration flows, and business rules associated with such integration flows, as well as to identify those agents that publish and subscribe to the defined events. In addition, the integration workbench 120 provides diagnostics for consistency checking and testing integration flows.

Figure 3:
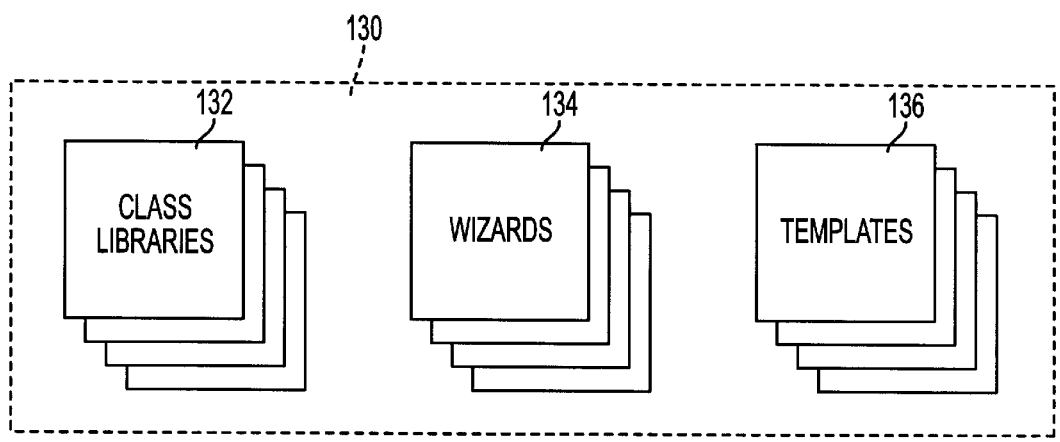
FIG. 3 depicts an adapter development kit used in the system that is shown in FIG. 2.

The ADK 130 is used to configure and generate customized intelligent agent-adapters 200. Shown in greater detail in FIG. 3, ADK 130 generally comprises an object framework including class libraries 132, wizards 134, and templates 136. The ADK 130 generates objects that can be accessed from conventional development tools. While system 100 includes a plurality of standard intelligent agent-adapters 200 for a wide range of applications and resources, there may be specific applications for which there is no such standard intelligent agent-adapter 200. In that event, ADK 130 further permits a custom, intelligent agent-adapter 200 to be built by those developers who are more familiar with the published interfaces that are provided by the target application environment.

The repository service 140 generally comprises a relational database (which contains all of the specifications for system 100, meta-data, and message broker service rules), and an interface to that relational database.

The administration console 160 is used to configure and manage the runtime environment of system 100, and generally comprises a graphical console. It serves as a control point for system configuration, maintenance, monitoring, and diagnostics. Through the administration console 160, each of the individual components of system 100 are managed, including comprehensive services such component initiation and termination, and built-in software distribution.

The integration server 170 implements intelligent messaging by triggering and executing integration flows to process events. It executes static and dynamic context sensitive rules that evaluate, modify, and route event data. As noted herein above, integration server 170 includes the enterprise messaging engine 180 comprising a distributed messaging subsystem, which manages all event data. It is, on the one hand, a key component of system 100. On the other hand, it is largely transparent to any user of system 100, and generally operates behind the scenes. It supports full persistence, once-and-only-once message delivery, and an in-memory mode for non-critical, high volume message requirements.

The node services component 190 manages start/restart recovery, exception handling, and dynamic configuration of system 100. It provides facilities for automated system installation and remote management across all participating clients and servers. Moreover, it is readily capable of installing and updating components remotely.

As noted herein above, the plurality of intelligent agent-adapters 200 include not only those standard intelligent agent-adapters 200 that are distributed with system 100, but also those custom intelligent agent-adapters 200 that are developed by ADK 130. Each such intelligent agent-adapter 200, regardless of its type, generally comprises a runtime interface module connecting a particular one of the external application resources 300 to system 100.

Figure 4A:
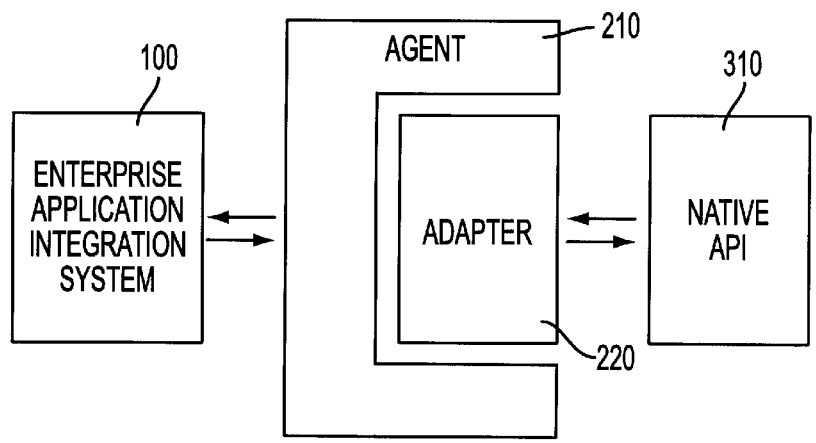
FIG. 4(a) illustrates a basic agent-adapter architecture that is useful in accordance with a first embodiment of the present invention.
Figure 4B:
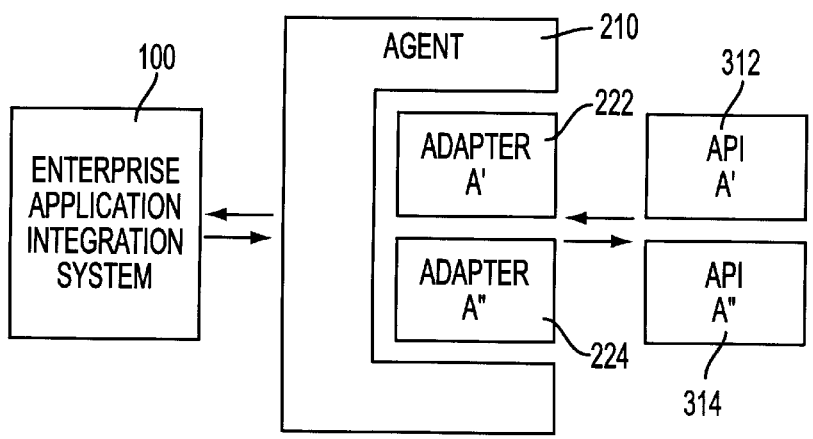
FIG. 4(b) illustrates an extensible agent-adapter architecture that is useful in accordance with a second embodiment of the present invention.

Referring for the moment to FIGS. 4(a) and 4(b), it may be appreciated that such intelligent agent-adapters 200, in accordance with a particularly important aspect of the present invention, combine the functionality of autonomous agents with adapter technology. The agent component 210 acts as an independent software process, which hosts one or more adapter components 220 (FIG. 4(a)), or 222 and 224 (FIG. 4(b)). It encapsulates sophisticated functionality such as store and forward caching, filtering, resource pooling, and scheduling.

A primary advantage of the agent-adapter architecture of the present invention is its ability to host complex business logic in order to maintain state and negotiate transactions with the application resources 300. This ability may be thought of as "conversational mode processing", which is particularly critical when integrating application resources 300 of a transactional nature. More often than not, data elements that may be required for brokering messages from such application resources 300 are deeply nested within sub-transactions. These deeply nested data elements can, thus, be obtained only by engaging in a conversation with the transactional application resource 300. Otherwise "primitive" adapters, which have been used in the past, do not adequately address the complex behavior of transactional application resources 300.

As shown in FIG. 4(a), a typical intelligent agent-adapter 200 according to the present invention includes an agent component 210 and an adapter component 220. On one side of this architecture, the agent 210 conforms to a specified event and messaging model of the system 100. Adapter 220, on the other side of this agent-adapter architecture, uses a native application programming interface (API) 310 of a particular application resource 300, or other suitably published interface mechanism. Together, agent 210 and adapter 220 mediate differences in interface protocols and data structures to provide a uniform, normalized view of the business events that they publish and consume.

Unlike past approaches to EAI, the foregoing agent-adapter architecture is extensible. It not only facilitates an ability to seamlessly accommodate changes to existing APIs, but it also continues to enable the use of those existing APIs with legacy systems. Shown more clearly in FIG. 4(b), this extensible agent-adapter architecture generally comprises an agent 210 encapsulating a first adapter A'222 and a second adapter A"224.

Adapter A'222, for example, corresponds to an application resource 300 having a basic set of APIs A'. On the other hand, adapter A"224 corresponds to the same application resource 300 having a newer set of APIs A". Users of such an extensible agent-adapter architecture may thereby choose to simultaneously adapt to both interfaces A' and A". For example, the basic set of APIs A' may correspond to a production environment, while the newer set of APIs A" may correspond to a pre-production environment of a newer version of a particular application resource 300. The newer set of APIs A" could, thus, be tested "live" within system 100, at the same time that the basic set of APIs A' will be used to maintain previously tested and proven functionality. In such a manner, this extensible agent-adapter architecture enables perfectly seamless negotiation of incremental changes to the application resource 300 into the integration environment.

Starting and Ending the System

Figure 5:
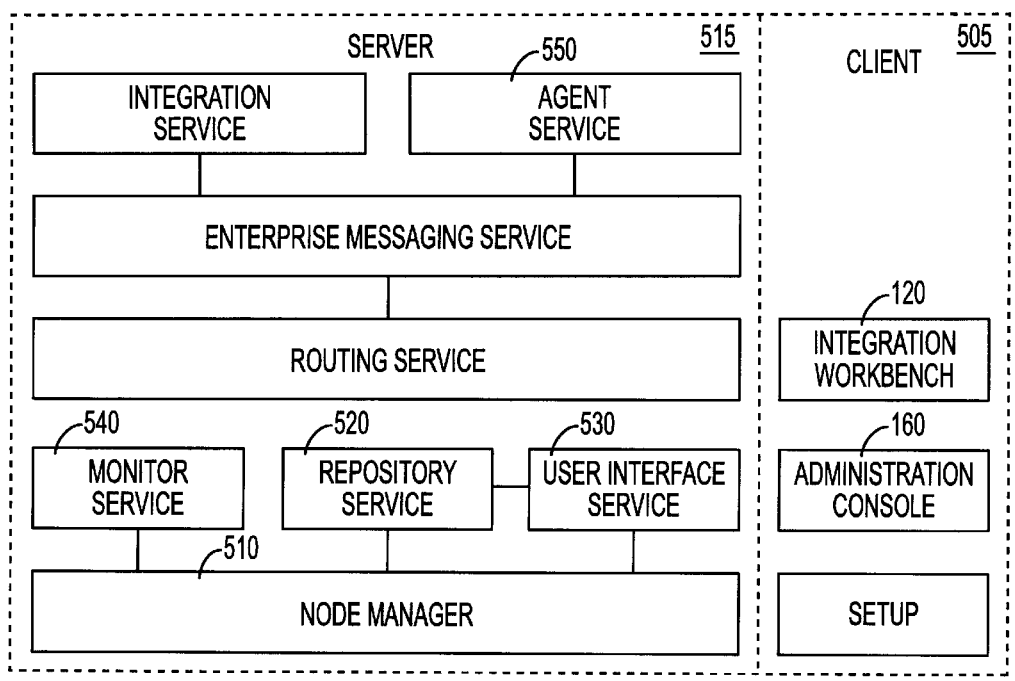
FIG. 5 is a block diagram illustrating system services according to the present invention.

When a user installs system 100, the main component the user installs is a node manager 510 as shown in FIG. 5. The node manager 510 is a Java virtual machine (JVM), which provides services to all of the other nodes and services the user installs in the system. System installation automatically creates repository service 520, user interface service (UIS) 530, and monitor service 540 on the machine that hosts the node manager 510.

Before the user can start a client 505 (e.g., the administration console 160 or the integration workbench 120) session, the user must start the node manager 510. As noted above, node manager 510 automatically starts the repository service 530 and the UIS 540. Otherwise, the user cannot use the administration console 160 or the integration workbench 120 unless those services are running. Depending on the particular administration console 160 or integration workbench 120 task the user is performing, other services may be required.

Once the node manager 510 is running, the user must configure the system nodes and services, including agent services 550 for the applications the user wants to integrate. The user initiates this by first using an administration console 160 session. The user can then start an integration workbench 120 session and begin designing integration flows 700 as shown in FIG. 7(a). When the user is finished designing such integration flows 700, the user may thereafter start them by starting nodes and services from an administration console 160 session.

When the user starts a client session, the user identifies the node manager 510 as the client's server 515. The user may connect as many integration workbench 120 and administration console 160 sessions to the node manager 510 as the user's business requirements dictate. All such integration workbench 120 and administration console 160 sessions will be read-only. Console sessions connected to the node manager 510 have access to the contents of the repository service 520 that is running on that node manager 510. When working with system 100, the user must run the node manager 510, an administration console 160 session, and a integration workbench 120 session.

Nodes

Figure 6A:
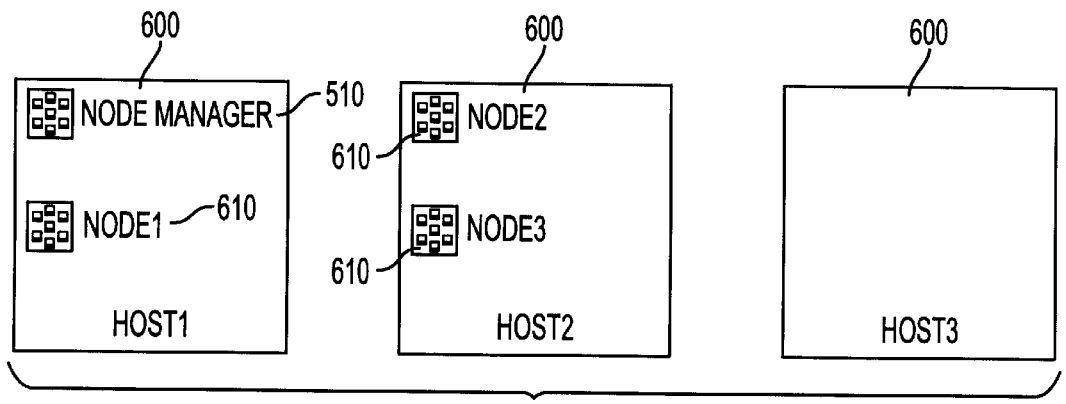
FIGS. 6(a), 6(b) and 6(c) depict various operating environments in which nodes and services according to the present invention are managed.
Figure 6B:
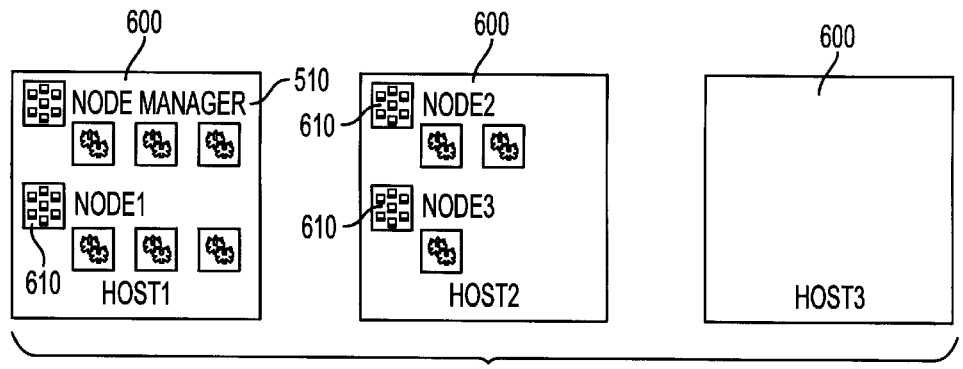
Figure 6C:
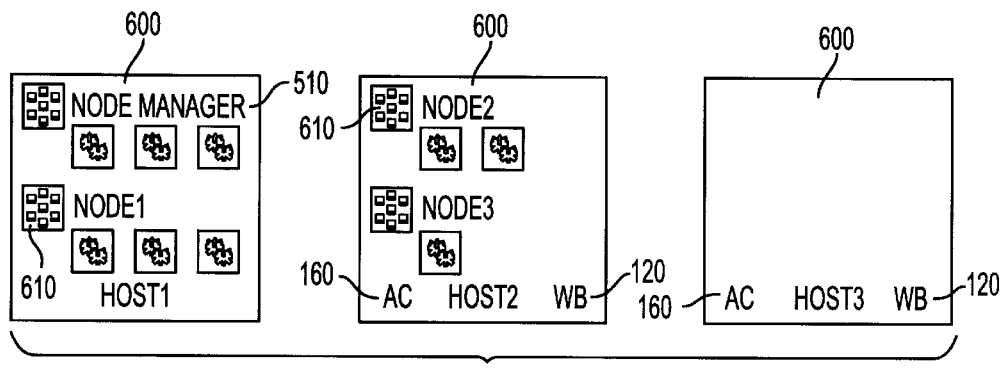

As noted herein above, and referring now also to FIGS. 6(a) through 6(c) in conjunction with FIG. 5, a node 610 is a physical process that runs on a host 600 and supports one or more services. Each node 610 is a Java virtual machine (JVM), and is recognized by the operating system as a javaw.exe process. The user must create at least one node 610 for each host 600 that runs an enterprise application that the user wants to integrate. The user can have as many nodes 610 as the user's business requirements dictate.

A service is an object that provides product functionality. System 100 generally comprises system services and application services. A client graphical user interface (GUI), such as the integration workbench 120 and administration console 160, enables the user to work with system 100. Clients 505 (FIG. 5) may run on the same physical host 600 on which nodes 610 and services are running, or it can run on a different host 600.

Each enterprise must also have a node manager 510. The node manager 510 provides services to all of the other nodes 610 in the system 100. It runs the user interface service (UIS) 530 and the repository service 520. FIG. 6(a) illustrates one environment having three hosts 600. Host1 is running the Node Manager 510, while Host1 and Host2 are both running nodes 610.

System 100 is a collection of system services and application services. System services support nodes and services. For example, the monitor service 540 stores system runtime data for nodes 610 and services. Application services provide functionality to system 100. For example, CICS agent services support adapters that need to connect to CICS applications.

System Services

System services according to the present invention generally comprise a user interface service (UIS) 530, a repository service 520, and a monitor service 540. UIS 530 more specifically provides the facilities necessary to run client components (i.e., the integration workbench 120 and the administration console 160). Likewise, the repository service 520 stores the configurations for all configured services and integration flow objects 700. Finally, monitor service 540 stores system runtime data, including system logs and statistics information.

Application Services

Referring again to FIG. 5, it can be seen that application services used in system 100 include the enterprise messaging service (EMS) 560, which enables the system 100 to use multiple messaging modes, including point-to-point, publish/subscribe, and request/reply messaging. EMS 560 also supports message hubs and provides message persistence. Application services also include an integration service (IS) 570, which enables the system 100 to transform messages, including splitting messages, combining messages, and manipulating message data. The IS 570 additionally supports transformers. RMI factory services (not shown) may optionally be used as an application service to manage remote method invocation (RMI) links to external applications. Routing services 580 also comprise an application service, which enables the system 100 to direct messages through the system based on a message's content, including filtering message content according to criteria the users define, and determining whether messages are valid. The routing service 580 also supports filters. Agent services 550 support adapters. The user must install an agent service on each host 600 that runs an enterprise application the user wants to integrate. As shown in FIG. 6(b), Host1 and Host2 are both running services. Host3 cannot run services because is does not have a node 710.

Clients

The system 100 includes two client GUIs that enable the user to work with integration flows 700. Clients may run on any host 600, regardless of whether the host 600 runs the node manager 730, runs nodes 710 and services, or does not run any nodes 710 or services. The user can install as many clients as the user's business requirements dictate. For example, a user might want to install clients 505 on a network-attached host to work with the user's integration flows 700 from a remote location. In FIG. 6(c), both Host2 and Host3 are running the administration console 160 and integration workbench 120 clients. Host1, on the other hand, is not running either the administration console 160 or integration workbench 120 clients.

Referring again to FIG. 7(a), in conjunction with FIGS. 7(b) and 7(c), a description in greater detail of the objects and integration flow used in accordance with the present invention will now be addressed.

For example, any given object comprises either a definition object 710 or an integration object 730. There are three basic types of definition objects 710, which may be used according to the present invention: (1) a message definition 713; (2) a transformer definition 716; and (3) a filter definition 719. Definition objects 710 may be used repeatedly in any given integration flow 700. For example, the same message definition 713 must be assigned to all objects that will handle system messages produced using that message definition 713. Moreover, the same filter definition 719 may be used in multiple sections of an integration flow 700.

The message definition object 713 identifies data that the system 100 is to extract from or propagate to an enterprise application 710. It also defines how the system 100 not only will construct system messages from enterprise application data, but also create enterprise application data from system messages.

Transformer definition objects 716 define how the system 100 will transform system messages extracted from one or more enterprise applications 710, 720 into system messages needed by other enterprise applications 710.

A filter definition object 719 defines criteria that the system 100 will use to filter unwanted system messages out of integration flows 700. In an integration flow that transforms new customer data into invoices, for example, one filter definition object 719 that might be useful would be one in which system messages about customers who have already paid would be filtered out.

Integration objects 730, of which there are three basic types, actually send or receive system messages. The three basic types of integration objects 730 are: (1) an adapter 731; (2) a message hub 735; and (3) a transformer 738. Furthermore, there are three basic types of adapters 731: (a) a source adapter; (b) a target adapter; and (c) a reply/request adapter.

A source adapter extracts the data from a source enterprise application 710, constructs system messages from that data, and sends those system messages to other integration objects 730 (e.g., message hub 735). A target adapter receives system messages from other integration objects 730 (e.g., transformer 738 through filter definition object 719), creates application data from those system messages, and propagates that data to a target enterprise application. A reply/request adapter (not shown) replies to requests for data from some other integration objects 730 by extracting the data from applications 710, and then sending it to the integration object 730.

In general, message hubs 735 are used to receive system messages from one or more source integration objects 730, and to hold those system messages until the system 100 can deliver same to one or more target integration objects 730.

Transformers 738 are generally used to implement transformer definitions in three steps. They first gather system messages from source integration objects 730 (e.g., message hub 735). After the gathering step, they next transform the content and format of the data contained within such system messages. They finally produce and send output system messages to target integration objects 730 (e.g., target adapter).

Message definitions 713 are the primary objects around which the integration flow 700 according to the present invention is built. When a user creates an integration flow 700, a message definition is assigned to every object in that flow. A message definition 713 not only identifies the kind of system message that the object is to handle, but it also defines the hierarchical structure or schema of that system message.

For example, a message definition 713 must be assigned to every source adapter in the user's integration flow 700. Each source adapter knows what kind of message it is to produce, based on the message definition 713 the user has assigned to it. Adapters 731, hubs 735, and filters 719 handle just one message definition 713. Transformer definitions 716 and transformers 738, on the other hand, are capable of handling multiple message definitions 713, both as inputs and outputs.

Some applications 710, can create the Java data types that the system 100 supports. In those cases, the source adapter can extract the data types specified in its message definition 713 and store them directly in a system message. Likewise, a target adapter can retrieve the data types from a system message and insert them directly into the application (e.g., target enterprise application). Other applications use a well-defined message format to describe the layout of their native data. In those cases, the message definition 713 for a source adapter must include instructions for creating Java data types from the application data. Similarly, the message definition 713 for a target adapter must include instructions for creating application data from the system Java objects.

A special kind of message definition 713 (i.e., the request/reply message definition) is used by integration objects 730 such as transformers 738 to request data from other the system objects 710, 730. Message definitions 713 can also specify message validation criteria. System 100 uses this criteria to determine whether system messages produced by adapters 731 and transformers 738 contain valid data (e.g., where the user includes a message definition 713 defining messages, which contains employee payroll information). The user, accordingly, may prevent inaccurate salary data from entering the system 100. If the message definition 713 contains an item element "Salary", for example, the user could then define validation criteria for the item stating that the message is valid only when the value in "Salary" is a positive number.

The user may organize related message definitions 713 into logical groups called message categories. Suppose, for example, that the user is integrating three applications using the system 100. The user might group the messages in the user's project into three message categories, one for each application.

Figure 9:
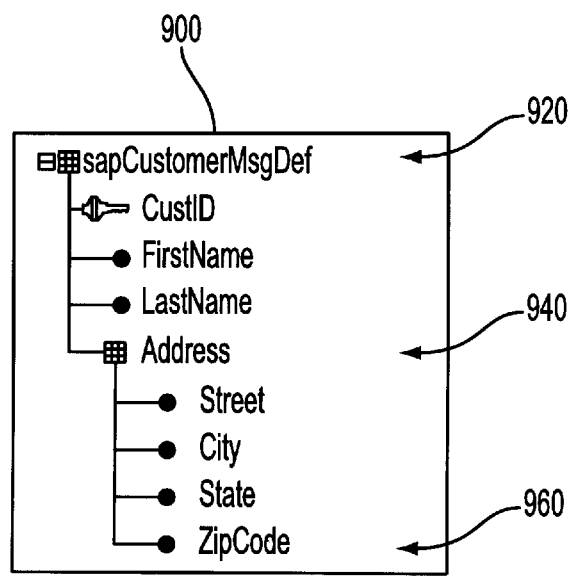
FIG. 9 illustrates a message schema used in the system according to the present invention.

The following describes in greater detail those elements that make up system messages and provides further details in regards to message validation. A message definition's message schema is made up of data objects, called message elements, which are arranged in a hierarchical structure as shown in FIG. 9. In general, a message schema 900 comprises one or more sections 920, one or more tables 940, and one or more items 960. Either a section 920 or a table 940 must appear at the top of message schema 900 hierarchy.

A section 920 is a non-repeating group of message elements. Such section elements do not themselves contain actual data. Instead, they contain other message elements that contain data (i.e., they contain items 960). Sections 920 can contain any combination of message element types.

A table 940 is a group of section elements, called rows that can repeat any number of times. Table elements also do not contain actual data. They contain other message elements that contain data (i.e., they contain items). Tables 940 can contain any combination of message element types.

An item 960 is a message element that contains data. Items 960 are the lowest level message elements in the hierarchy of the message definition. They cannot contain other message elements.

Each message definition can contain criteria for validating messages based on that definition. That is, when the user define a message definition, the user can specify criteria that data in individual message elements must meet for a message to be considered valid within the system 100.

The user can specify validation criteria for all levels of a message. That is, the user can specify criteria for message items within sections or within tables. The entire message either passes the validation criteria and continues through the flow, or does not pass and is discarded. If even one row of a table does not pass specified criteria, the entire message does not pass. The system 100 validates every message produced by an adapter 731 or transformer 738 using the validation criteria in the appropriate message definition.

Adapters 731 connect with enterprise applications to extract or propagate data. Each adapter 731 produces, receives, or replies to messages using the message definition the user assigns to it. The system 100 provides standard adapters 731 for the applications it will integrate. Each standard adapter 731, as noted herein above, is either a source, a target, or a reply/request adapter, and is designed for a specific agent service type. For example, for EntireX Broker, the system offers an ETB Standard Source Adapter and an ETB Standard Target Adapter. Standard adapters are generic. They provide basic exception handling and can handle any message definition. If a standard adapter does not include all code the user need to interact with an application (e.g., the user want to specify more detailed exception handling), the user can create a custom adapter using the ADK 130. The user can also use the ADK 130 to create custom adapters for applications not currently supported by the system 100. Likewise, the user can use the ADK 130 to create custom adapters 731 that connect to any application with a JAVA application programming interface (API).

To use a standard or custom adapter 731 in an integration flow 700, the user must configure it to handle a specific message definition. The user can configure as many of each type of adapter 731 as necessary to handle all messages the user needs to include in integration flows 700.

Source adapters extract data from enterprise applications and produce messages that they send to other integration objects. Specifically, a source adapter: (1) polls for or is notified by its application of a particular type of event that has occurred at the application (e.g., data on a new customer has been entered); (2) extracts the data relating to the event from the application; (3) using message definition instructions, constructs a system message from the data; and (4) produces a message and sends it to one or more target integration objects 730.

Target adapters receive messages from other the system objects 710, 730 in integration flows 700 and propagate the message data to enterprise applications. Specifically, a target adapter: (1) receives system messages from one or more source integration objects 730; (2) using message definition instructions, creates application data from the system message; and (3) propagates the data to the target application by inserting new data, updating data, or deleting data as appropriate.

Reply adapters extract data from enterprise applications when requested by integration objects 730 such as transformers 738. Specifically, a reply adapter: (1) receives a request message from an integration object 730; (2) extracts the requested data from its enterprise application 708; and (3) sends the data to the transformer 738 in a reply message based on the same message definition as the request message.

Adapters 731 are hosted by agent services. Agent services provide information adapters 731 need to connect to their applications (e.g., passwords and user IDs). The system 100 offers agent services for every enterprise application it can integrate. That is, it offers an SAP R/3 agent service, an EntireX Broker agent service, and so on. The system 100 also offers agent services for custom adapters the user create using the ADK 130.

The user needs one agent service for each enterprise application the user wants to integrate using the system 100. For example, if the user wants to integrate three SAP R/3 systems with one RDBMS, the user needs three SAP R/3 agent services and one RDBMS agent service. Each agent service hosts all adapters 731 for the enterprise application to which the agent connects.

Transformer definitions 716 define a process that transforms messages containing data extracted from one or more applications into messages containing data needed by one or more applications. Transformers 738 implement transformer definitions 716 by gathering input messages from source objects, transforming the data, and sending output messages to target objects.

The transformation process defined in a transformer definition 716 always involves at least two kinds of messages: the primary input message, and one or more output messages. The primary input message typically contains most or all of the data the user want to send in output messages to the target applications. Output messages contain data from the input messages, transformed as necessary for target applications.

When the user creates a transformer definition 716, the user identifies the message definition 713 that defines the messages the user want to use as the primary input, and the message definitions 713 that define the messages the user want to produce as outputs. A single transformation process can produce any number of outputs. The user then creates a sequence of steps that define when to read input data, how to transform the input data, how to map the input data from input message definitions to output message definitions, and when to write the transformed data to actual output messages.

The user can transform input data in any way necessary to create the output messages the users need. For example, the user can create a transformation expression that specifies connecting a message item containing a customer's first name and a message item containing the customer's last name, because a target application requires the customer's full name in one data field. On the other hand, the user can create a transformation expression that specifies selecting only certain characters from a message item, or padding a message item with spaces to make it the right length for the corresponding data field in the target application. The user can produce different output messages by writing them at different points in the transformation process.

When the primary input message does not contain all data needed to produce the output messages, the user can obtain supporting input for the transformation process using request/reply message definitions. For example, suppose the primary input message the user is using in the transformer definition uses abbreviations for United States state names (e.g., VA for Virginia).

The target application requires full state names. To obtain the full state names needed to produce the output messages, the user would use a request/reply message definition that can send the abbreviations to an application and receive the state names in return.

After the user has created a transformer definition 716, the user can test it to make sure it produces the proper output messages before using it in an integration flow 700. The user can then assign the transformer definition to one or more transformers 738.

A transformer 738 implements a transformer definition 716. When the user creates a transformer 738, the user specify objects 710, 730 to use as sources of the primary input message and the objects 710, 730 that are to be targets for the output messages. The user also specifies the objects that are to reply to requests for supporting inputs.

When the transformer 738 receives a primary input message from a source object, it runs the sequence of steps defined in the transformer definition 716 that make up the transformation process. It reads the primary and supporting input messages, transforms the input data, writes the transformed data to output messages, and sends the output messages to the target objects.

Figure 8:
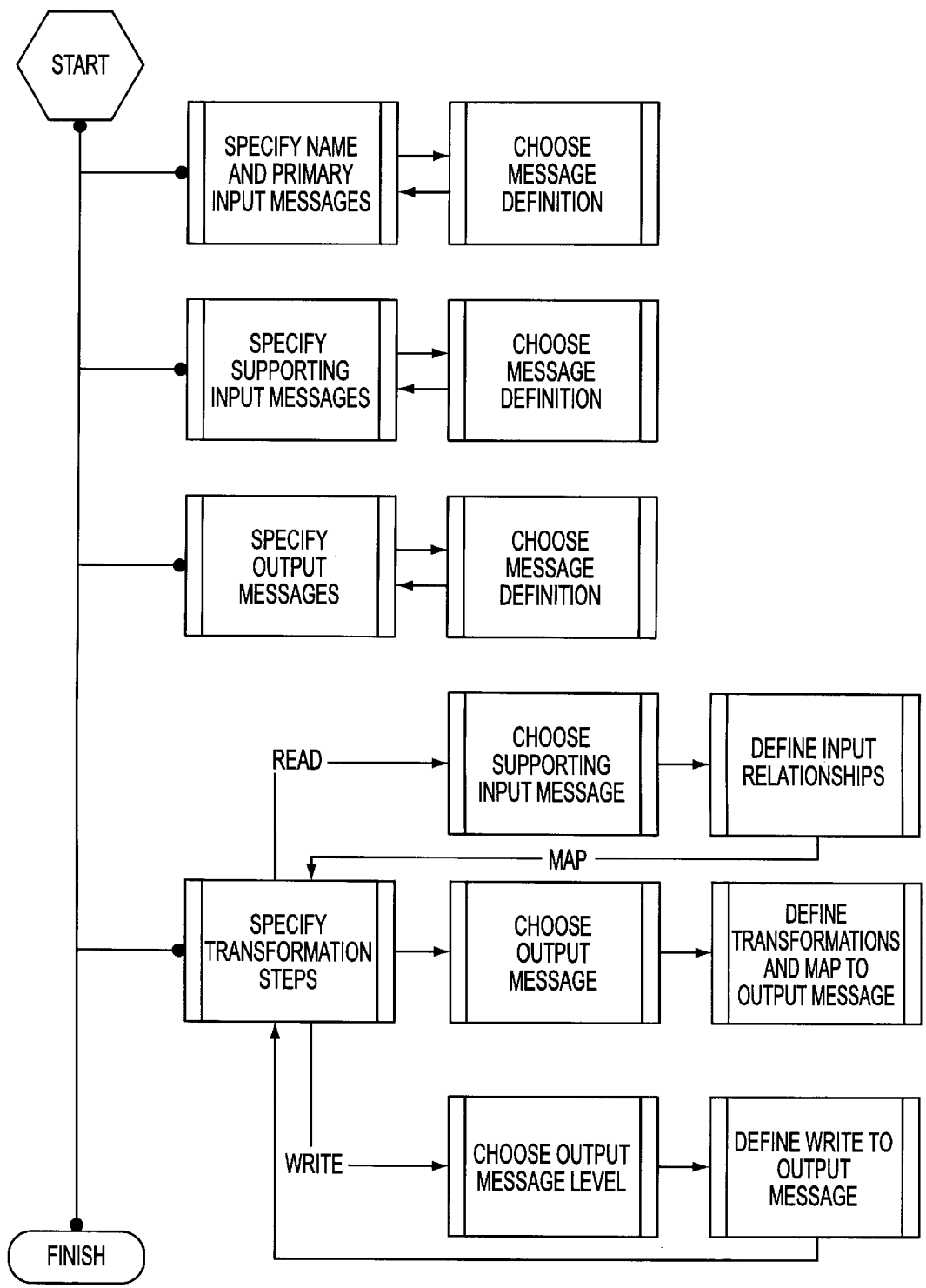
FIG. 8 illustrates a typical transformation process used in accordance with the present invention.

FIG. 8 shows a typical transformation process as is shown in FIG. 4, in which a transformer definition 719 may be created in accordance with the present invention by the following steps. The transformer definition 719 must first be named, and a message definition 713 chosen for those messages the user wants to be the transformer's primary input. Next, message definitions 713 must be specified for those messages that the user wants to be the transformer's supporting inputs. Specific message definitions 713 may optionally be provided for those messages that the user wants to be the transformer's outputs. A transformation step sequence must then be undertaken to read input data; transform input data and map the transformed data to output message definitions; and write mapped data to output messages. Using messages based on the primary and supporting input message definitions 713, the user should then test the transformer definition 719 to make sure it generates the proper output messages. Further instructions on working with transformer definitions after the user has created them (e.g., editing, deleting, or printing them) may be found in the above-mentioned patent application for an "Extensible Distributed Enterprise Application Integration System", Ser. No. 09/412,396, which is incorporated herein by reference.

Hubs 735 are message holding areas for adapters 731 and transformers 738. Hubs 738 allow adapters 731 and transformers 738 to exchange messages asynchronously, and simplify links among objects.

For example, the user may have a source adapter that produces messages to a transformer 738. The user may want the adapter to produce and send its messages regardless of whether the transformer 738 is ready to receive them. The user could set up the adapter to send its messages to a message hub 735, and set up the transformer 738 to receive the adapter's messages from that hub 735. The system delivers messages from a hub 735 to a target object when the target is ready to receive them.

Furthermore, the user may have three source adapters sending messages based on the same message definition 713 to five targets. If the user did not use a hub 735, the user would have to create a total of 15 links among the objects. On the other hand, if the user uses a hub, the user would have to create and maintain only eight links. Message hubs 735 can hold one kind of message only (i.e., messages produced from a single message definition 713). Targets of hubs 735 have durable subscriptions. The system 100 keeps track of the messages each target object has received from the hub 735, as well as those that the target object has not yet received. If a target becomes inactive, the system 100 remembers the last message the target received. When the target next becomes active, the system 100 delivers only the messages the target has not yet received. If hub subscriptions were not otherwise durable, target objects would receive messages that arrived at hubs while the targets were active, but would never receives messages that arrived at the hubs when the targets were not active.

The user can choose from two messaging styles the user wants the system 100 to use when delivering messages from the hub 738: (1) point-to-point, where the system 100 delivers each message to the first available target only; or (2) publish/subscribe, where the system 100 delivers each message to every object the user has identified as a target of the hub 735.

If the user wants to screen a certain kind of data out of part of an integration flow 700, the user must use a filter definition 719. Filter definitions 719 specify criteria based on message data (i.e., data that passes the criteria continues through the flow), while data that does not pass the criteria is discarded.

When the user wants to filter a certain kind of message, the user creates a filter definition 719 and assigns it to one or more links between objects that handle that kind of message. The system 100 applies the criteria in the filter definition 719 to all messages sent along those links.

For example, consider the situation in which a hub 735 sends messages containing data on new customers to a target adapter. The user may want only data on customers who have not yet paid to reach the target adapter. In order to do so, the user creates a filter definition 719 that specifies the criterion "Status=Paid", and assigns it to the link between the hub 735 and the adapter 731.

The user can create one or more filter definitions 719 for each message definition 713 in the user's integration flow 700. The user can assign a single filter definition to multiple links, or the user can assign different filter definitions for the same kind of message to different links.

For example, consider the situation in which a hub 735 sends messages containing data on new customers to two adapters. The user may want one adapter 731 to receive only data on customers who have paid, and the other adapter 731 to receive only data on customers who have not yet paid. The user creates two filter definitions 719. One specifies the criterion "Status=Unpaid", and the other specifies the criterion "Status=Paid". The user then assign each filter definition to the appropriate link.

When the user creates a filter definition 719 for messages that do not contain tables of data, the criteria the user specifies affects the entire message. The entire message either passes the filter criteria and continues through the flow, or does not pass and is discarded.

When the user creates a filter definition 719 for messages that contain tables of data, the user can specify criteria that affect the entire message or that affect only the data within a table. If the user specifies criteria for message items in a section 920, the entire message either passes the criteria and continues through the flow, or does not pass and is discarded. If the user specifies criteria for message items in a table 940, the message continues through the flow with only those rows of data that pass the criteria. Rows that do not pass the criteria are discarded.

For example, consider the situation in which a message contains a table 940 with nine rows of data, one for each of nine new customers. If the user set up a filter definition 719 that filters out customers who spent $1000 or less, rows containing data on customers who spent more than $1000 would continue through the flow, while rows containing data on customers who spent $1000 or less would be discarded.

After the user has created a filter definition 719, the user can test it to make sure it works properly before using it in an integration flow.

Once the system objects the user wants to use in an integration flow 700 exist, the user can indicate how the user wants the system 100 to route messages among them. To do so, the user sets up links among the integration objects 730. Each link establishes one object as a source and the other as a target, or one object as a requester and the other as a replier. Source adapters are always message sources. They can send messages to target adapters of the same agent service type (e.g., an SAP R/3 source adapter can send messages to an SAP R/3 target adapter), to message hubs 735, and to transformers 738.

Transformers 738 can be targets, requestors, and sources. They can receive primary input messages from source adapters, message hubs 735, and other transformers 735. They also can request supporting input messages from reply adapters 624 and message hubs 735, and send output messages to target adapters, hubs 735, and other transformers 735.

Message hubs 738 can be targets and sources. Target adapters are always targets. They can receive messages from source adapters of the same agent service type, from hubs 735, and from transformers 738.

By default, the system 100 uses "message persistence". That is, it writes each message it delivers from one integration object 730 to another to stable storage in a location the user specifies. If a system failure occurs while a message is in transit, the system 100 can retrieve the message from storage when the system is restored and deliver the message to its targets.

Because message persistence increases system overhead, the system 100 allows the user to turn off persistence for any integration object 730. However, if a system failure occurs while messages to or from that object are in transit, those messages might be lost. The system 100 offers other delivery-related options that help the user manage the user's system resources. The system 100 maintains message holding areas for each integration object in a flow 700. The user can also control the size of these holding areas.

The user can limit the number of messages the system 100 holds for each object at one time, and the user can limit the length of time the system 100 holds each message. If an integration object 730 produces messages more quickly than its targets can receive them, these limits can prevent the object's holding area from growing to a size that strains system resources.

The user designs all integration flows 700 within a project on the workbench 120. Those integration flows 700 that the user designs and saves (i.e., the definition 710 and integration objects 730 that the user creates, and the links among them) are all stored in the repository 140. The project is a logical structure that lets the user view the repository 140. Each installation of the system 100 has one project and one repository 140.

In accordance with another important aspect of the present invention, system 100 comprises a distributed system. That is, the user can run the system components that make up the system 100 on one or more physical machines (i.e., hosts), but all of the components working together as one application.

System 100 also includes two client graphical user interfaces (GUIs) that enable the user to work with integration flows in the following manner. Regardless of whether the host runs the node manager, runs nodes and services, or does not run any nodes or services, the user may run clients on any host. The user may install as many clients as the user's business requirements dictate. For example, the user might want to install clients on a network-attached host to work with the user's integration flows 700 from a remote location. As described in greater detail herein below, GUIs on the workbench 120 enable the user to design integration flows 700. GUIs on the administration console 160, on the other hand, help configure and manage the system components (i.e., the nodes and services). Referring now to FIG. 6(c), both Host2 and Host3 can be seen as running the administration console 160 and workbench 120 clients. Host1 is not running either of the administration console 160 or the workbench 120.

There are two primary interfaces within the system 100: (1) the workbench 120 and the administration console 160. The workbench 120 provides tools for creating and modifying integration flows 700, while the administration console 160 provides all of tools for managing the system nodes and services. Both are described in greater detail herein below.

Integration Workbench

Figure 10:
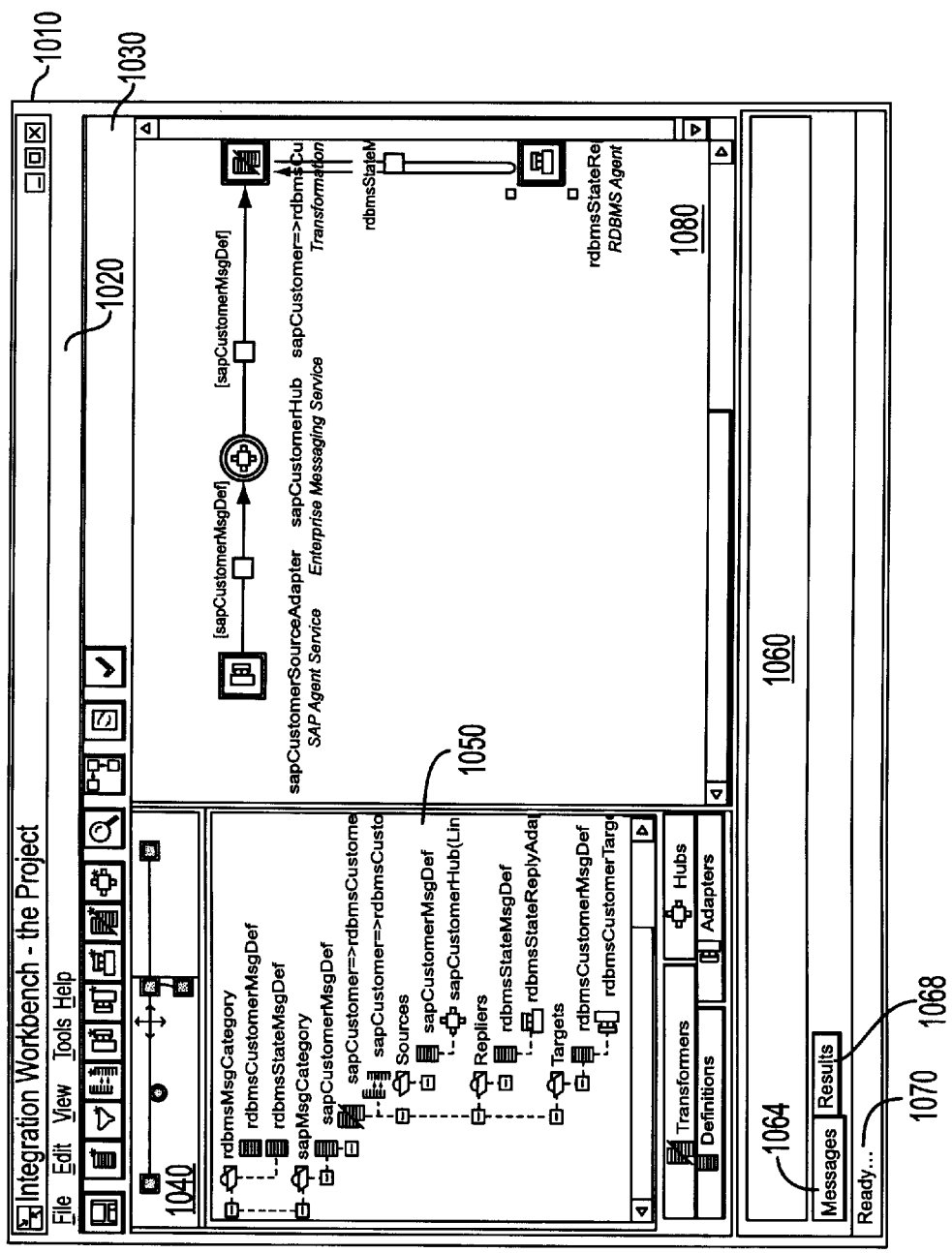
FIG. 10 depicts a screen capture of an integration workbench window.
Figure 11A:
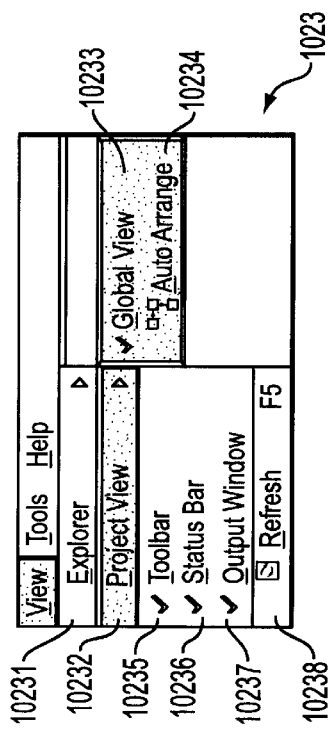
FIGS. 11(a), 11(b), 11(c), 11(d) and 11(e) illustrate various drop down menus associated with the window shown in FIG. 10.
Figure 11B:
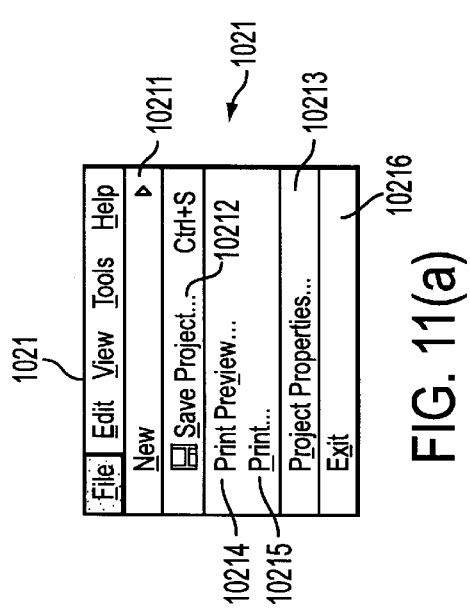
Figure 11C:
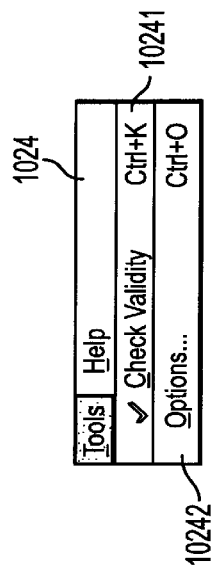
Figure 11D:
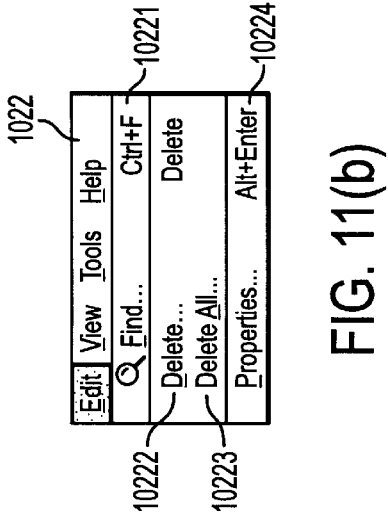
Figure 11E:

When the user first opens the integration workbench 120, the user sees the "Main" window 1000 shown in FIG. 10. A title bar 1010 appears on every window in the system 100, and shows the title for that window. It also contains buttons that allow the user to reduce or increase the size of the window, or close it.

As shown in FIGS. 11(a) through 11(e), the menu bar 1020 offers one of five drop-down menus: "File" 1021, "Edit" 1022, "View" 1023, "Tools" 1024, and "Help" 1025. Some menu options are available only under certain circumstances. For example, the "Save Project" option 10212 on File menu 1021 is available when the user has made changes to an integration flow 700, but is unavailable when there are no unsaved changes. Unavailable options appear dimmed. It saves changes the user has made to the user's project. The "Print Preview" 10214 and "Print" 10215 options display a preview of or prints a report on objects, the project, an Explorer 1050 tab, or the Project View 1080. The "Project Properties" option 10213 displays property sheets for the project, while the "Exit" option 10216 closes the integration workbench 120, and asks whether to save unsaved changes. Finally, the "New" option 10211 opens wizards that help the user create objects.

In the Edit menu 1022, the "Find" option 10221 searches for specified objects and lists found objects on the results tab in the output window 1060. The "Delete" 10222 and "Delete All" 10223 options deletes the selected object, or all objects in a project. Finally, the "Properties" option 10224 displays property sheets for the selected object.

The View menu 1023 includes the following options. An "Explorer" option 10231 toggles between displaying all objects on the current Explorer 1050 tab, or top levels only. A "Toolbar" option 10235 shows or hides the toolbar 1030, a "Status" option 10236 shows or hides a status bar 1070, or the "Output Window" option 10237 shows or hides the output window 1050. The "Project View" option 10232 shows or hides the global view 1040 by way of "Global View" 10233, or it has the system 100 arrange objects on the Project View 1080 by way of an "Auto Arrange" selection 10234. Finally, the "Refresh" option 10238 refreshes the Explorer 1050 and Project View 1080 display.

There are two options in the "Tools" menu 1024. A "Check Validity" option 10241 checks integration flows 700 and displays messages in the messages tab 1064 of the output window 1060, while an "Options" option 10242 lets the user set preferences for the integration workbench 120 display. Finally, an "About" option 10251 in the Help menu 1025 displays the currently running version number for the integration workbench 120 software.

System 100 offers several shortcut menus on various parts of the integration workbench 120, and the options for those menus are usually the same as those on the drop-down menus discussed herein above. The user can select any object on the Explorer 1050 or the Project View 1080, and right-click to display a shortcut menu offering options available for that object. For example, the shortcut menu for a target adapter offers an option to add sources, while the shortcut menu for a source adapter offers an option to add targets. The user can right-click on any blank area of the Explorer 1050 or Project View 1080 to display a shortcut menu offering appropriate options. For example, the shortcut menu for the Explorer 1050 offers "Expand All" and "Collapse All" options.

The toolbar 1030 contains buttons that let the user quickly access a variety of functions, as will be explained in greater detail herein below. The Project View 1080 shows all integration objects in the user's project. That is, it shows adapters 731, transformers 738, and hub 735. It shows links among the objects, the kind of messages delivered along each link, and any filter definition assigned to a link. It also shows the services responsible for running each kind of object (e.g., for each adapter, the Project View 1080 lists the hosting agent service).

The Project View 1080 dynamically reflects changes the user make to the user's project. If the user creates an integration object 730, the system 100 immediately shows the object 730 on the Project View 1080. If the user deletes an integration object 730, the system 100 immediately deletes the object 730 from the Project View 1080. If the user links two objects 730, the system 100 shows the link on the Project View 1080.

On the Project View 1080, adapters 731 appear as raised squares with the appropriate adapter icon (i.e., source, target, or reply). Transformers 738 appear as depressed squares with the transformer icon. Hubs 735 appear as raised circles with the hub icon. Under each object 730 is its name. Each link between a source object and a target object appears as a line, with an arrow pointing to the target object.

Each link between a requester and a reply object appears as a curved line that starts at the requester, curves at the replier, and ends with an arrow pointing back at the requester. A raised square on each link changes color to indicate the presence or absence of a filter definition 719. The user can drag an object's icon from one position to another on the Project View 1080. The arrows on the links between objects do not change direction when the user moves the icon. That is, moving an icon does not change an object's relationship to other objects in the integration flow 700. For example, a source remains a source even if the user moves it from the left of a target to the right of the target. The user can open an object's property sheets from the Project View 1080. The user can also use shortcut menu options to perform a variety of other tasks from the Project View 1080, such as adding sources for an object or adding a filter to a link.

The Global View 1040 is a high-level view of the Project View 1080. It shows all objects in the user's project, in simplified form. It enables the user to see entire integration flows even when they do not entirely fit within the current focus of the Project View 1080. It also lets the user change the focus of the Project View 1080 to any part of the project more quickly and easily than the user can by scrolling. The user can use the Global View 1040 to change focus by dragging the light grey window to the part of the project the user want to see.

The Explorer 1050 shows all the system objects in the user's project in a hierarchical structure similar to that used by the Microsoft Windows Explorer. Every level of the hierarchy except the bottom level is preceded by a plus or minus sign. The user can click the plus sign next to a level to display its sublevels, or click the minus sign next to a level to make sublevels disappear.

The user can also open an object's property sheets from the Explorer 1050. The user can use shortcut menu options to perform a variety of other tasks from the Explorer 1050, such as adding sources for an object or adding a filter to a link.

The Explorer 1050 has several tabs. Each shows objects in integration flows from a different perspective, as described below. Every message definition 713, transformer definition 716, and filter definition 719 in the user's project is listed under the message definition that is its primary input.

Every adapter 731 in the user's project, organized by agent service type and agent service is also shown. The tab also lists connections for each agent service type; sources, targets, or requesters for each adapter; and filter definitions assigned to links between each adapter and its sources or targets. Each object appears on at least one Explorer 1050 tab, and might appear on several.

Consider, for example, that a hub 735 is a source of messages to a transformer 738. The hub 735 would appear on the "Hubs" tab, and the transformer 738 would be listed as one of its targets. The transformer 738 would also appear on the "Transformers" tab, and the hub 735 would be listed as one of its sources.

The Output Window 1060 has two tabs, the Messages tab 1064 and the Results tab 1068. The Messages tab 1064 shows the results of validity checks that the user runs using the Check Validity option 10241 on the Tools menu 1024. This option makes sure all objects in the integration flows 700 are in use and linked correctly. If the validity check finds problems with linking, it displays messages to that effect. Messages on the Messages tab 1064 usually concern orphaned and dangling objects.

An orphaned object is not linked to any other object in the flow 700. A dangling object is linked from one direction but not from the other. For example, a hub 735 is dangling when it is the target of objects but is not a source to any object. In such a case, objects would send messages to the hub 735, but no object would receive messages from the hub.

Every transformer 738 in the user's project, organized by primary input message definition, are also shown. The tab also lists the transformer definition assigned to each transformer 738; sources for every input message, targets for every output message, and the replier for every supporting input message; and filter definitions 719 assigned to links between each transformer 738 and its sources or targets.

Every hub 735 in the user's project is also shown. The tab also lists sources or targets for each hub 735 and filter definitions 719 assigned to link between each hub 735 and its sources or targets. An orphan can exist in an integration flow 700 without causing problems. A dangling object, however, causes a disconnect in the integration flow 700, and thus is a problem that must be corrected.

The Results tab 1068 shows the results of searches conducted using the Find option 10221 on the Edit menu 1022. The user can locate a found object listed on the Results tab 1068 by double-clicking it. The system automatically selects the object on an appropriate Explorer tab 1050.

When a user places the cursor on a menu option or toolbar button, the status bar 1020 shows help text for that option or button. Otherwise, the word Ready . . . appears in the status bar 1020.

The user uses wizards 134 (FIG. 3) to create objects, and property sheets to edit them. The wizard panels and corresponding property sheets for an object are nearly identical. The following provides greater detail with respect to such wizard panels and property sheets, and the standard command buttons available on them.

Wizard Panels

When the user first opens a wizard 134, the user always see an introductory (Start) panel that describes the steps the user will follow in using the wizard. Similarly, the user always sees a concluding (Finish) panel at the end of each wizard. In between these two panels are more wizard panels and dialog boxes, all tailored to the object the user is creating. The first panel after the Start panel looks like this: Buttons on the panel help to guide the user through the object creation process.

For example, Next becomes available on the current panel only after the user supplies required data on that panel, while Finish becomes available only after the user supply all required data on all panels.

The Navigator also helps to guide the user. The button for the current panel is green, while the buttons for panels that the user has displayed already or can display are yellow. Buttons for panels the user cannot yet display are white. If the button for the panel following the current panel is white, the user has not yet supplied required data on the current panel.

When the user opens the property sheets for an object, the user see tabs that match the wizard panels for that object. The user can edit some of an object's properties through its property sheets. The properties the user can edit will be available; those the user cannot edit will not be available. When the user clicks OK on any property sheet, the system saves all changes the user has made on every sheet.

The following table lists and explains the most common command buttons available from system wizard panels, dialog boxes, and property sheets.

| Button | Function |
| --- | --- |
| Add | Displays a list from which the user can choose one or more objects to add to the current list |
| Apply | Stores changes the user has made in memory |
| Back | Returns to the previous panel in the current wizard without losing choices on other panels |
| Cancel | Loses the user's specifications on the current wizard panel or dialog box and closes the wizard or dialog box |
| Choose | Displays a list from which the user can choose an object to enter in the current text box |
| Delete | Deletes the currently selected item from the project and the repository service |
| Edit | Displays specifications for the currently selected item so the user can edit them |
| Finish | Closes the wizard and displays the object the user created on the Project View and the Explorer |
| New | Opens the wizard for the kind of object list on the current list so the user can create a new object of that kind and add it to the list |
| Next | Displays the next panel in the current wizard |
| OK | Saves choices the user has made on the current dialog box or property sheet in memory |
| Properties | Displays editable property sheets for the currently selected object |
| Remove | Removes the currently selected object from the current list but does not delete it from the project or the repository service |

When the user work withs the integration workbench 120, the user might change certain application settings, such as the size and placement of the integration workbench 120 window, the relative widths of different parts of the display, and the currently selected Explorer tab. By default, the system saves these settings each time the user ends a integration workbench 120 session and applies them to subsequent integration workbench 120 sessions.

The user can prevent the system from saving these settings using the Options option on the Tools menu. If the user wants to have the system discard changes to application settings each time the user end a integration workbench 120 session, clear the Remember application settings on exit check box.

When the user first opens the administration console 160, the user sees its main window. The user performs most administration console tasks through wizards and the explorer 1210. Administration console wizards guide the user through the process of creating nodes and services. After the user has created those nodes and services, the user can view and edit them using property sheets. The explorer 1210 indicates the status of nodes and services the user has configured on host machines in the user's enterprise. The user can organize the explorer 1210 display by hosts and nodes or by services. The output window 1220 lists messages and the results of searches.

Creating an integration flow 700 in accordance with the present invention may be done as follows. The user first must obtain agent services from the system 100. On the administration console 160, the user then configures the system nodes of each host machine on which an application the user wants to integrate is running. Then, the user configures the required services on the nodes, including an agent service for each application that the user is going to integrate.

In order to plan an integration flow, the user should determine the following factors. For example, the user must determine the kinds of data the user need to extract from applications and propagate to applications. The user should also consider: (1) how the user wants to route messages among the system objects; (2) how the user need to transform the data from one application so it can be used by other applications; and (3) whether the user need to filter certain data out of the flow.

On the workbench 120, the user should first create a project, and then create an integration flow in the following manner. First, the user should configure adapters 731 to interact with the user's applications and create the message definitions 713 the user needs to produce the proper messages in the integration flow 700. These message definitions 713 should then be tested to make sure they produce the proper messages.

Next, the user should create hubs 735 to hold messages from adapters 731 and transformers 738. The user may then create transformer definitions 716 to transform messages from the source application 510 to messages for the target application 520. Furthermore, the user may create sample input messages and use them to test each transformer definition to make sure it produces the proper output messages.

Then, the user should create the transformers 738 necessary to implement those transformer definitions 716. As needed, the adapters 731, transformers 735, and hubs 735 should be linked. If the user needs to filter certain data out of the flow 700, the user should then create filter definitions 719. Preferably using sample messages, the user should next test the filter definitions 719 to make sure they filter out the proper data. Then, the user may assign the filter definitions 719 to links between objects.

On the workbench 120, the user should then check the validity of the integration flow 700 and correct it as necessary. The user may then save and close the project. On the administration console 160, the user should then configure the log viewer so the user can view messages on system activity. If the user wants to view statistics on system activity (e.g., number of messages produced in specific time intervals by individual transformers), the user should then configure the statistics viewer.

Again, on the administration console 160, the user may start the integration flow by starting the relevant system nodes and services, including the agent services for the applications the user is going to integrate. Next, the user will check the log and statistics to make sure the integration flow 700 is running properly. If the user needs to make changes to the integration flow 700, the user should accordingly stop the relevant services on the administration console 160, modify the integration flow 700 on the workbench 120, and restart services on the administration console 160.

The following describes to one of ordinary skill in the art the procedures that may be used with a source adapter wizard, a target adapter wizard, and a reply adapter wizard, all in accordance with the present invention, to properly configure an adapter. In general, there are four separate processes.

First, one must carry out the following general steps: (1) naming the adapter; (2) choosing the agent service one desires to host the adapter; and (3) choosing the message definition for messages that the adapter is to produce, receive, or reply to. Second, one must carry out the following general steps: (1) choosing a particular adapter that is to be configured (i.e., standard or custom); (2) providing connection information; and (3) providing implementation information. More often than not, the step of providing implementation information includes the step of extracting the message definition of that adapter.

The third process depends on the type of adapter to be created. If one is creating a source adapter, one must specify the targets to which the adapter is to be used to send messages. On the other hand, if one is are creating a target adapter, one must specify the sources from which the adapter is to be used to receive messages. If one is creating a reply adapter, furthermore, one must specify the requesters (i.e., transformers) to which the adapter is to be used to send reply messages.

One must finally specify delivery options (e.g., message lifetime) for the adapter's messages. However, before one can create an adapter, the agent service that is to host the adapter must exist on the Administration console. For example, before one can create an EntireX Broker adapter, the agent service for the EntireX Broker must exist. If one wants to also specify source, target, or requester objects for an adapter using the adapter wizard, those objects must exist before one opens the adapter wizard.

Figure 12:
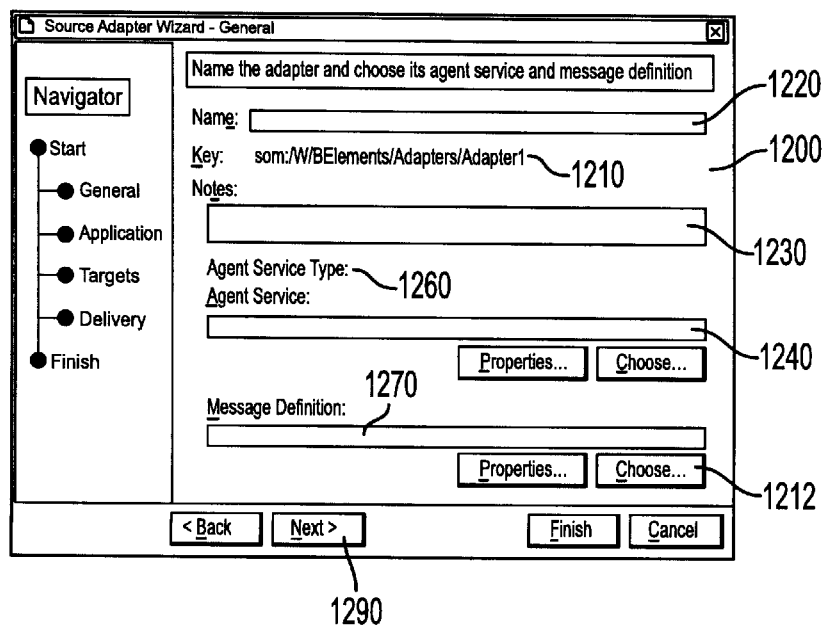
FIG. 12 depicts the general panel of an Adapter Wizard used according to the present invention.

With the EAI system 100 according to the present invention, one initiates these processes by clicking the adapter symbol on the toolbar. The appropriate adapter wizard is opened and a start panel displayed. Upon clicking "Next" on the start panel, the general panel shown in FIG. 12 is displayed.

The Key box 1210 shows the unique identification system 100 will give the new adapter, reflecting the path to the adapter in the repository. Thereafter, data is entered on the panel 1200 as follows. In the Name box 1220, the name of the configured adapter is first typed in. That name cannot include spaces, and it must be unique (i.e., it cannot already be in use by an existing system object). Comments that provide information about the configured adapter may then be entered in the Notes box 1230. Next, within the Agent Service box 1240, one must specify the particular agent service that will host the configured adapter (i.e., the agent service to which the enterprise application may be connected and the adapter is for). This may be accomplished by clicking "Choose" at 1212.

Figure 13:
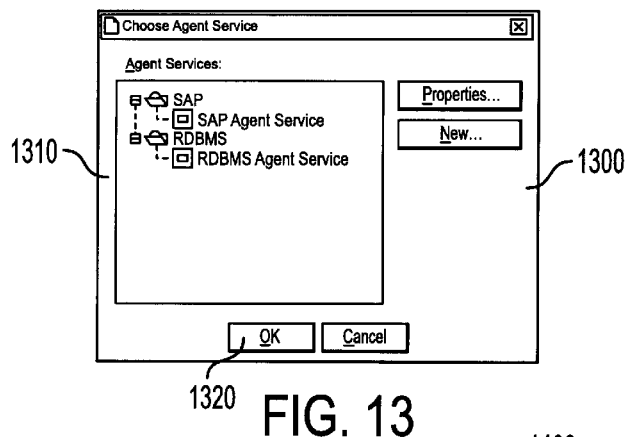
FIG. 13 illustrates a Choose Agent Service dialog box in the system according to the present invention.

The system 100 will then display the Choose Agent Service dialog box 1300 that is shown in FIG. 13. As is readily apparent, box 1300 lists all agent services in the current project by agent service type. For example, one may select the agent service for an SAP adapter at 1310 and click OK at 1320. If the user is creating a configured adapter using a custom adapter, the particular agent service for which the user has created the adapter must be chosen. The system 100 then redisplays the General panel (FIG. 12), and shows the agent service chosen in the Agent Service box 1300. As a result, and next to the Agent Service Type label 1260 (FIG.

12), the system 100 will show the agent service type for the agent service chosen.

Figure 14:
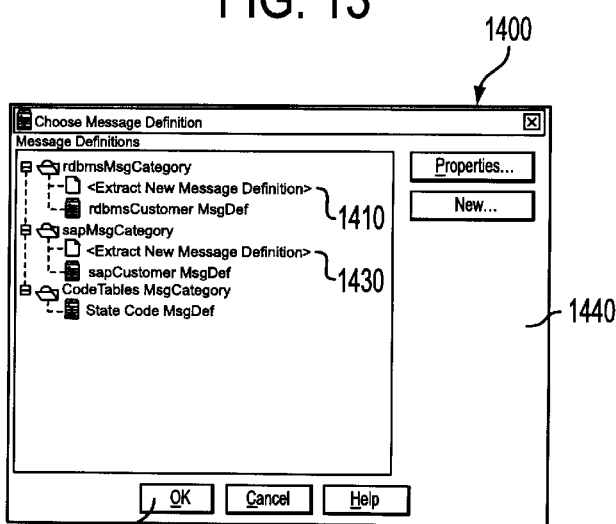
FIG. 14 depicts a Message Definition dialog box in the system according to the present invention.

In the Message Definition box 1270, the user must then specify a given message definition for messages that the adapter is to produce, receive, or reply to. This may be accomplished by clicking Choose at 1280. The system 100 will then display the Choose Message Definition dialog box 1400 shown in FIG. 14. This box 1400 lists all message definitions in the current project by message category. It also lists a special message definition (i.e., an Extract New Message Definition at 1410) for each message category. For example, one may select the message definition for the configured adapter and click OK at 1420. If the adapter is a source or target adapter and the user wants to create the message definition by extracting it from an external source (e.g., the adapter's application or a file), the user must then select Extract New Message Definition at 1430.

Figure 15:
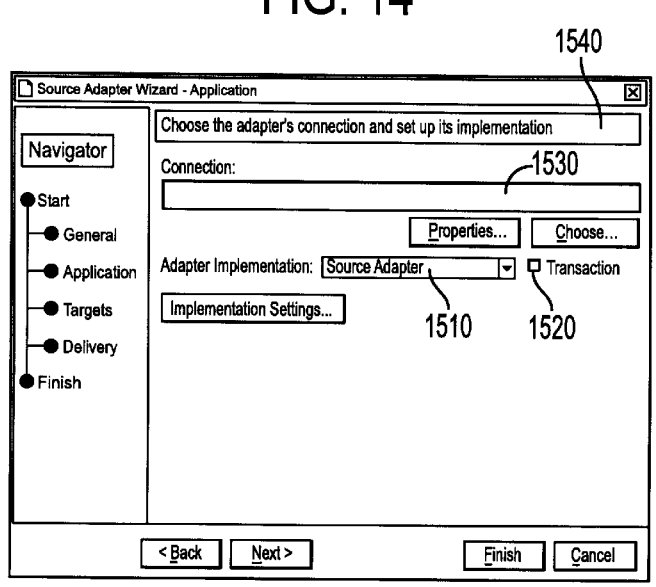
FIG. 15 illustrates a Choose Connection dialog box in the system according to the present invention.

The system 100 then redisplays the General panel 1200 (FIG. 12) and shows the user's choice in the Message Definition box 1270. Thereafter, the user may click Next at 1290 to display the Application panel 1500 shown in FIG. 15. From the Implementation list 1510, the user then chooses the standard or custom adapter to be configured. Each standard and custom adapter contains parameters it needs to interact with its application. Moreover, the user may create multiple configurations for each adapter. If one chooses an agent service other than the ADK agent service on the General panel 1200, the list will include all standard adapters the system 100 provides for the specified agent service type and adapter type (i.e., source, target, or reply) combination. Standard adapters can handle any message definition.

If one chooses, instead, the ADK agent service and a specific message definition, that list will include all custom adapters created at the user's site for the specified agent service type, adapter type, and message definition combination, in addition to all custom adapters that handle any message definition. If one specifies the Extract New Message Definition option 1430 (FIG. 14), that list includes only the customer adapters that handle any message definition.

The Transactional option 1520 reflects the transactional capabilities of the adapter chosen from the Implementation list 1510. If the adapter is set up so that transactionality is optional, the check box is enabled at 1520. Otherwise, it may be selected or cleared. If the adapter must be transactional, the check box is selected and the user is incapable of clearing it. If the adapter, instead, does not support transactionality, the check box 1520 will be clear, and the user cannot select it.

Figure 16:
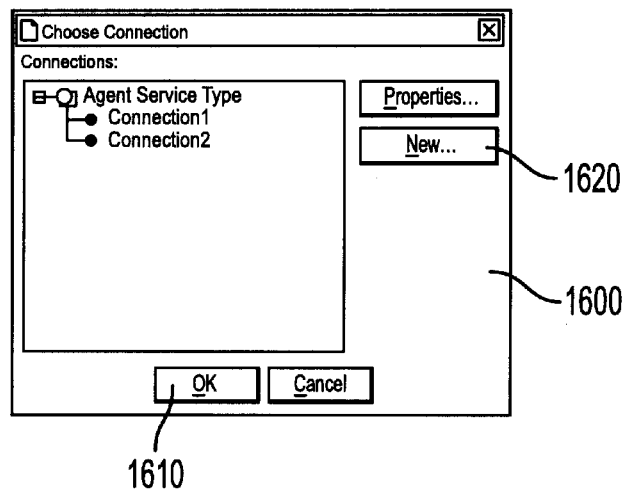
FIG. 16 depicts the general panel of a Connection Wizard used according to the present invention.

In Connection box 1530, the user then must specify the connection that contains the particular parameters that the adapter will use to connect to its application. For standard adapters, the user must always specify a connection. On the other hand, for custom adapters, a connection is only required if the custom adapter does not specify connection information. Once the connection is specified, the user the must click choose at 1540. The system 100 then displays a Choose Connection dialog box 1600, as shown in FIG. 16, which lists all connections in the current project for the selected agent service. If the connection needed is listed, the user will then select it and click OK at 1610. One may use the same connection for multiple adapters.

The system then redisplays the Application panel 1500, and shows the connection chosen by the user in the Connection box 1530. Otherwise, if the user wants to create a new connection, the following steps may be taken.

The user first clicks New at 1620 (FIG. 16). Thereafter, the system 100 opens the Connection wizard and displays the Start panel. The user then clicks Next, and the system 100 displays the General panel 1200 as shown in FIG. 12.

In the Name box 1220, the user must then type the name of the adapter to be created. This name must by unique within the type of object and should be the same as the ERP system name (e.g., SAP). In the Notes box 1230, the user may then type comments that provide information about the adapter. Thereafter, the user clicks Next at 1290.

Figure 17:
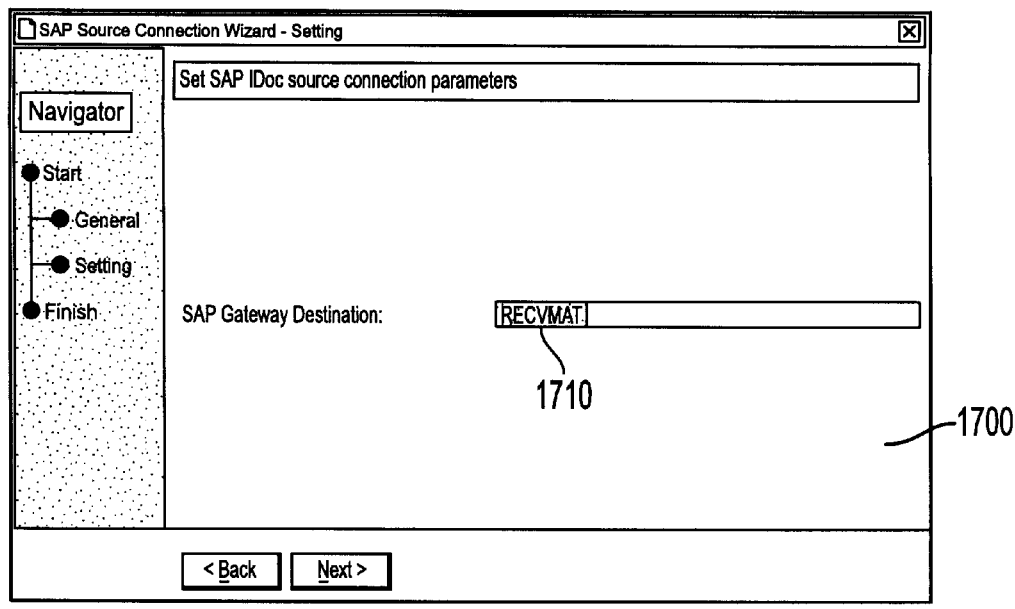
FIG. 17 illustrates an SAP Gateway Destination box in the system according to the present invention.

If the user is creating a source adapter, the system 100 displays the Settings panel 1700 shown in FIG. 17. In the SAP Gateway Destination box 1710, for example, the user must type a unique name that identifies the connection to the SAP Gateway. This name will then be used as a key to point to the entry inside the SAP rfc.ini file.

It should be noted at this juncture, however, that all SAP source adapters must use the same connection configuration under a single node because there is a single IDoc Listener that corresponds to the connection/node. The IDoc Listener is equipped only to get the communication protocol and then to get the IDoc. Multiple nodes can use the same single connection, however.

If the user is creating a target adapter, the system 100 displays a similar Settings panel. In the SAP Host Destination box, the user then types a unique name that identifies the connection to the Application Host. In the Client box, the user next types a unique number, which identifies the SAP Client No. In the User ID box, the user then types the SAP User ID. In the Password box, the user then types the SAP password. In the Receiving Partner box, the user then types the receiving partner name, which corresponds to the logical system inside SAP. This name becomes part of the IDoc control record value. In the Sending Partner box, the user then types the sending partner name, which identifies the system 100 to SAP within the distribution model. This name becomes part of the IDoc control record value. The user may then click Next, whereupon the system 100 enables the Finish button. To complete, the user finally clicks Finish. The system 100 then closes the Connection wizard and returns to the Application panel 1200.

The agent-adapters 200 of system 100 combine the notion of autonomous agents with adapter technology. As noted above, the agent side acts as an independent software process that hosts the adaptive technology. It encapsulates sophisticated functionality such as store and forward caching, filtering, resource pooling and scheduling. A primary advantage of this agent side architecture of such agent-adapters 200 is its ability to host complex business logic in order to maintain state and negotiate transactions with the application. This is known as conversational mode processing and is particularly critical when integrating with transactional systems. Often, the data elements required for brokering is deeply nested within sub-transactions and can only be obtained by engaging in a "conversation" with the transactional system. "Primitive" adapters that are commonplace today are severely inadequate in addressing the complex behavior of transactional systems.

System 100 includes a number of standard agent-adapters, each of which supports a broad set of application resources—such as CICS, SAP, RDBMS and MQ Series. Additionally, libraries and templates are available in the ADK 130. These are used to create custom agent-adapters to integrate with systems not directly supported by the standard agent-adapter suite.

Referring again to FIGS. 4(*a*) and 4(*b*), agent-adapters 200 interface with the application resources on one side and the infrastructure of system 100 on the other. On the one hand, the adapter half of each agent-adapter 200 uses the API of its particular application resource, or any other published interface mechanism. On the other hand, the agent side conforms to the event and messaging model of system 100 as described in greater detail herein below. In combination, the agent and adapter mediate the differences in interface protocols and data structures, providing a uniform, normalized view of the business events that they publish and consume.

Unlike other application integration solutions, the extensible design of the adapter architecture provides—the ability to seamlessly accommodate change to application interfaces, while still supporting the current set of basic interfaces. This is particularly important with systems that are already in production. For instance, a packaged application having a basic set of interfaces A' which are supported by a particular version of agent-adapter 200. If a newer version of the application incorporates a newer set of interfaces A", the user may choose to simultaneously adapt to the older interfaces A' for the production environment, while adapting to A" for a pre-production environment in order to test the new interfaces. With this facility, incremental change into the integration environment can be negotiated seamlessly.

Every component of system 100 is distributable across all supported platforms. agent-adapters 200 flexibly extends this to the participating applications. Key components of system 100 (e.g. agent-adapters 200 or Integration Server 170) can, thus, be co-located with applications, or accessed remotely, or both. Numerous deployment configurations are possible—the environment is optimized to balance availability, performance and administration requirements.

Many standard adapters 200 are supplied with system 100, including SAP, MQSeries, ENTIRE Broker, RDBMS & CICS. As such, the adapters 200 support rapid deployment and easy integration of these information resources. They also reduce training and skills required. The ADK 130, including all of its automation wizards templates, provides high productivity. It is adaptable to any user's IDEs, and it facilitates customizing supplied adapters and developing custom interfaces. The adapters 200 are made up of popular language and interface bindings, including C++, Java, EJB, CORBA, COM, and Natural. In such a manner, they plug into any user's environment and tools. They leverage in-house language expertise, and they are adaptable to complex resource interface requirements. The agent-adapter architecture according to the present invention, thus, provides a robust facility supporting far more than simplistic interfaces. It ensures a uniform event across the resource portfolio.

The agent-adapter subsystem comprises the runtime interface modules that connect external applications to the EAI. On the adapter side, it is the physical interface to the external application. The agent side acts as a host for the adapter, manages resources and publishes events on behalf of the adapter.

EAI agent-adapters combine the notion of autonomous agents with adapter technology. The agent component acts as an independent software process that hosts the adaptive technology. It encapsulates sophisticated functionality such as store and forward caching, filtering, resource pooling, scheduling and dispatching. A primary advantage of the agent component is its ability to host complex business logic in order to maintain state status and negotiate transactions with the external application. This is called conversation mode processing and is particularly critical when integrating with transactional systems. Often the data elements required for brokering are deeply nested within sub-transactions and can only be retrieved by engaging in a "conversation" with the transactional system. The "primitive" adapters of the prior art do not address this problem in the complex behavior of transactional systems.

The adapter component uses the resource API. The agent component conforms to the EAI event and messaging model. In combination, the agent and adapter mediate the differences in interface protocols and data structures, providing a uniform, normalized view of the business events that they publish and consume.

The EAI adapters provide communication to third party (external) application packages. There are currently four basic types of message processing supported by any given adapter. Each type of processing is implemented within its own JAVA Class. These classes will serve as base classes to be extended by an application specific implementation.

The basic types of communication used by the adapter do not rely on the underlying messaging semantics implemented by the node/agent. They could be used over either pub/sub or point to point protocols without affecting the adapter behavior. The agent will make this determination based on its configuration definitions.

The base adapter classes within system 100 are as follows. The "Adapter Main" class provides the ability for the adapter to start itself and process its configuration definitions. It is also responsible for instantiating instances of the classes to be used by the four possible types of adapter communications. The "Adapter Receiver" class provides the ability for the adapter to receive a document from EAI and pass it on to the third party package. The "Adapter Sender" class provides the ability for the adapter to receive a document from a third party package and pass it on to EAI. The "Adapter Responder" class provides the ability for the adapter to receive a document from EAI, pass it on to a third party package, receive a response from the third party package and return the response to the EAI for processing. The "Adapter Requestor" class provides the ability for the Adapter to receive a document from a third party package, pass it on to EAI for processing, receive a response from EAI and return the response to the third party package.

The EAI agent-adapter interface according to the present invention is realized by the adapter implementing several JAVA interfaces, while the adapter to agent interface is realized by the adapter using known methods of the node/agent components.

According to still another important aspect of the present invention, every adapter must implement the following interface. For the AdapterBridge, the method:

initialize(Agent-adapterConfig)

is invoked by the agent during initialization and used by the adapter to bootstrap itself. The adapter bridge is within the method that the adapter 220, 222, 224 must query the agent 210 to determine what document definitions are to be processed and the type of processing provided for each document. This is accomplished using the following agent methods:

GetSendDocumentDefinitions()

getReceiveDocumentDefinitions()

getRequestDocumentDefinitions()

getResponseDocumentDefinitions()

This method will then parse the AdapterConfiguration document to locate the subsection pertaining to the specific document definition, harbor the document specific configuration information and create an instance of a specific class based on processing type (send, receive, request or response). It will subsequently either start a Thread(Send or Request types), issue the Agent.setReceiveListener() (Receive type) or issue the Agent.setResponseListener() (Response type) to register the agent callbacks to be invoked when a message arrives.

The restart () method is invoked by the agent 220, 222, 224 to cause the adapter 210 to terminate all activity, reload configuration data and restart itself. The shutdown () method is invoked by the agent 220, 222, 224 during termination processing.

The following interfaces are also implemented by the adapters 200 as described herein below. For the ReceiveListener interface, an onReceiveMessage(ReceiveData)

method is invoked by the agent 210 on receipt of a JMS message, and the agent will pass the document on to the adapter for processing. This processing will occur under control of the JMS session thread. The adapter processing will basically consist of a one way routing of the document to the third party software application using the interfaces provided by the application. It should be noted, however, that there is no reply expected from the application on this type of call. The adapter 220, 222, 224 will be expecting only a success or failure response from the application. If EAI is expecting an actual response from the third party system, the ResponseListener interface should be used instead.

For the SendListener interface, an onSendTimerEvent(SendData)

method is invoked by the agent 210 if the adapter 220, 222, 224 is utilizing the timer feature of the node/agent. This feature is useful when the third party interface has no way to implement an event driven notification for documents to be sent to EAI for processing.

For the RequestListener interface, an onRequestTimerEvent(RequestData)

method is invoked by the agent 210 if the adapter 220, 222, 224 is utilizing the timer feature of the node/agent. This feature is useful when the third party interface has no way to implement an event driven notification for documents to be sent to EAI for processing. It should be noted at this juncture, however, that the RequestListener interface differs from the SendListener interface, in that it will send the document to EAI and wait for a document in response. This response will then be passed back to the third party system.

For the ResponseListener interface, an onResponseMessage(ResponseData)

method is invoked by the agent 210 on receipt of a JMS message, and the agent 210 will pass the document on to the adapter 220, 222, 224 for processing. This processing will occur under control of the JMS session thread. The adapter processing will consist of routing of the document to the third party software application using the interfaces provided by the application and then sending the response back into the EAI system 100 for additional processing. However, if the EAI system 100 is not expecting an actual response from the third party system the ReceiveListener interface should be used instead.

Having discussed in some detail the general architecture of the agent-adapters according to the present invention, as well as the general means of building those agent-adapters, a second more detailed embodiment of that invention will now be disclosed.

Figure 18:
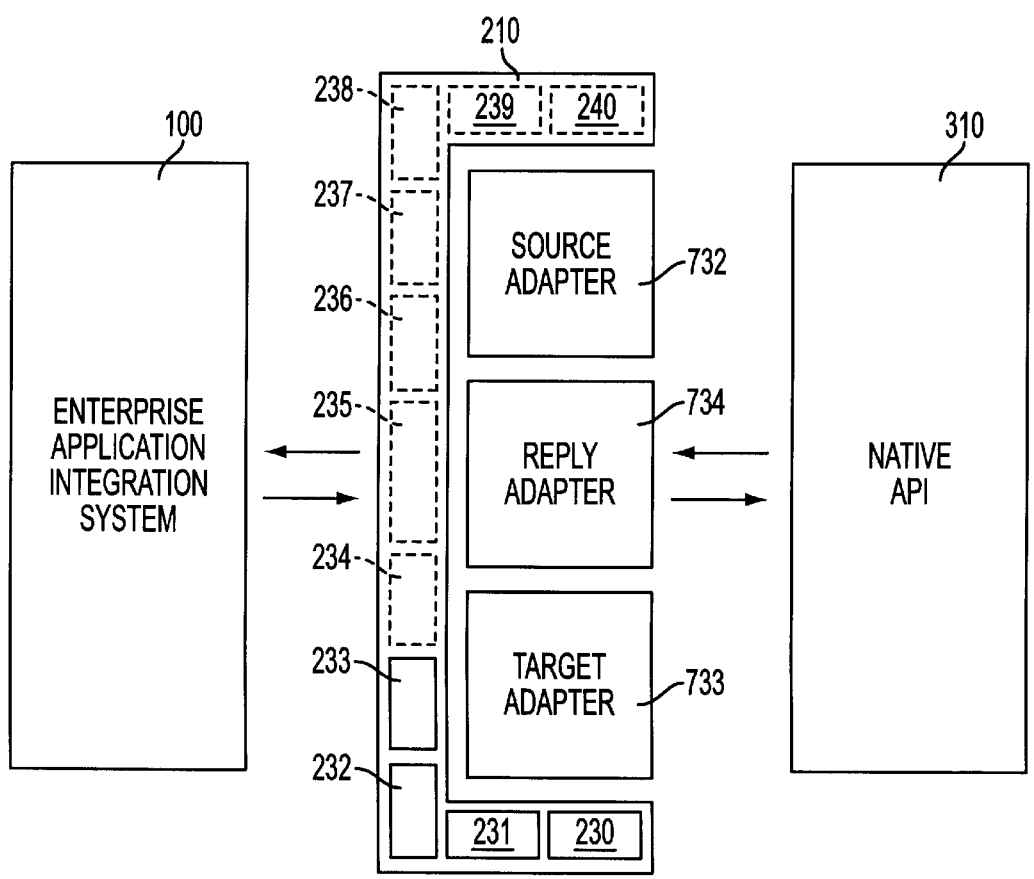
FIG. 18 is a block diagram illustrating a presently preferred embodiment of an agent-adapter according to the invention.

Referring to FIG. 18, there is shown a greatly enlarged view of an agent-adapter 200 in accordanc with a presently preferred embodiment of the invention. Like the agent-adapters shown in FIGS. 4(*a*) and 4(*b*), the agent-adapter 200 shown in FIG. 18 is used to communicate between the system 100 and the native API 310 of an enterprise application (not shown). The agent-adapter 200 according to this embodiment, however, includes three adapters 732, 733, and 734. As described in greater detail herein before, adapter 732 is of the source adapter variety, adapter 733 is of the target adapter variety, and adapter 734 is of the reply adapter variety. It may be readily appreciated to one of ordinary skill in the art, therefore, that the agent-adapter 200 according to this embodiment of the present invention is not limited to any given number of specifically-directed adapters which may be encapsulated by agent 210.

Moreover, according to another particularly important aspect of the present invention, agent 210 comprises a plurality of objects 230–240 useful in extending the abilities of agent-adapter 200. For example, object 230 presently comprises a transformation object which facilitates performance of otherwise centralized functions of system 100 locally within the agent-adapter 200 itself. Object 231 similarly comprises an error management object, object 232 a connection management object, and object 234 a rules management object. Further extensiblity of agent-adapter 200 is only limited by the number of additional objects 235–240 that may be co-located with the agent 210.

The foregoing is a particularly important aspect of the present invention, since it facilitates decentralization of the message handling aspects of system 100. Distributed enterprise application integration is, therefore, assured, since the agent-adapter 200 according to this embodiment of the present invention may be associated with any node 610 across the system 100.

The examples shown and described herein above are not meant to limit the scope of the invention. Accordingly, modifications and variations according to the present invention will become apparent to those of ordinary skill in the art, without departing from the spirit and scope of the appended claims.

What we claim as our invention is:

1. A system for integrating a plurality of computer applications, comprising:

first means for routing plurality of messages within the system;

means for storing a plurality of data transformation configurations and a plurality of business process rules;

means for applying said data transformation configurations to said plurality of messages;

second means for routing said plurality of messages between said first means for routing messages within the system and a plurality of computer applications, wherein said second means for routing said plurality of messages between said first means for routing messages within the system and the plurality of computer applications, includes:

an adapter configured for each of the plurality of computer applications;

an agent service hosting said adapter;

a message definition for each of said plurality of messages said adapter will produce, receive, or reply to;

means for connecting said adapter to its respective computer application; and means for implementing said adapter through said connecting means.

2. In an enterprise application integration system that integrates a plurality of enterprise applications, each of which have a respective native format for creating, sending, receiving, storing, and processing a plurality of messages, the improvement comprising:

an agent-adapter including a plurality of adapters encapsulated by an agent;

wherein each of said plurality of adapters encapsulated by said agent includes means for performing a discrete function while encapsulated by said agent.

3. The improvement according to claim 2, further comprising a plurality of nodes and a plurality of system services resident on said nodes.

4. The improvement according to claim 3, wherein said agent further comprises a plurality of objects embedded therein, each of said plurality of objects adapted to perform a discrete function.

5. The improvement according to claim 4, further comprising a message schema that includes a plurality of message elements.

6. The improvement according to claim 5, wherein said plurality of message elements are arranged in a hierarchical structure including a top-level message element, an intermediate-level message element, and a lower-level message element.

7. The improvement according to claim 6, wherein said top-level element comprises a section element.

8. The improvement according to claim 7, further comprising one or more table elements subordinate to said section element.

9. The improvement according to claim 8, further comprising one or more item elements subordinate to respective ones of said one or more table elements.

10. The improvement according to claim 6, wherein said top-level message element is selected from the group consisting of a section element and a table element.

11. The improvement according to claim 4, wherein each of said plurality of objects embedded in said agent is adapted to perform its respective function at any one of said plurality of nodes.

12. The improvement according to claim 4, wherein each of said plurality of objects embedded in said agent is adapted to perform its respective function in conjunction with respective ones of said objects embedded in another agent in the system.

13. The improvement according to claim 2, wherein said agent-adapter includes object-oriented means for controlling said performing means.

14. The improvement according to claim 13, wherein said agent further comprises a plurality of objects embedded therein, each of said plurality of objects adapted to perform a discrete function.

15. The improvement according to claim 14, wherein a first of said plurality of objects embedded in said agent further comprises means for managing connections of said agent-adapter between selected ones of the plurality of enterprise applications and the system.

16. The improvement according to claim 14, wherein a second of said plurality of objects embedded in said agent further comprises means for managing errors detected in said agent-adapter between selected ones of the plurality of enterprise applications and the system.

17. The improvement according to claim 14, wherein a third of said plurality of objects embedded in said agent further comprises means for managing a transformation of the plurality of messages within said agent-adapter between selected ones of the plurality of enterprise applications and the system.

18. The improvement according to claim 14, wherein a fourth of said plurality of objects embedded in said agent further comprises means for managing a set of business process rules performable by said agent-adapter between selected ones of the plurality of enterprise applications and the system.

19. The improvement according to claim 6, further comprising object-oriented means within said agent-adapters for accessing, retrieving, and processing a plurality of message elements corresponding to of the native format of the enterprise applications.

20. A system for integrating a plurality of computer applications, comprising:
an enterprise messaging system, said enterprise messaging system passing messages between said computer applications;
a database storage system coupled to said enterprise messaging system, said database storage system storing a plurality of data transformation configurations and a plurality of business process rules;
an integration service coupled to said enterprise messaging system, said integration server comprising a data transformation engine using the data transformation configurations stored in said database storage system and a rules evaluation engine using the business process rules stored in said database storage system; and
a plurality of agent-adapters coupled to said enterprise messaging system, each said agent-adapter comprising one or more adapter portions and an agent portion encapsulating all of said one or more adapter portions, each agent-adapter coupled to a respective one of said computer applications, each agent-adapter passing messages between said enterprise messaging system and said respective computer application.

21. The system according to claim 20, wherein each said agent-adapter comprises an adapter portion including an object and an agent portion encapsulating said object.

22. The system according to claim 21, wherein each said adapter portion is selected from the group consisting of a source adapter, a target adapter, and a reply adapter.

23. The system according to claim 22, wherein said computer applications comprise one or more source applications and one or more target applications.

24. The system according to claim 22, further comprising a plurality of source adapters, each of which correspond to a respective one of said source applications, and a plurality of target adapters, each of which correspond to a respective one of said source applications.

25. The system according to claim 23, further comprising a plurality of reply adapters, each of which correspond to a respective one of said computer applications.

26. The system according to claim 20, wherein said enterprise messaging system passes messages between said computer applications in a publish and subscribe mode.

27. The system according to claim 20, wherein said enterprise messaging system passes messages between said computer applications in a request and reply mode.

28. The system according to claim 20, wherein said integration service system splits and combines messages received from said enterprise messaging system and performs content-based routing of messages to said computer applications.

29. The system according to claim 20, wherein each said agent-adapter translates messages being passed from said enterprise messaging system to said respective computer application from a system format to a respective computer application format, and translates messages being passed from said respective computer application to said enterprise messaging system from the respective computer application format to the system format.

30. The system according to claim 20, wherein each said agent-adapter further passes messages between other said agent-adapters and said respective computer application.

31. The system according to claim 20, further comprising a graphic user interface coupled to said enterprise messaging system, said graphic user interface providing an interface to add additional data transformation configurations and additional rules to said database storage system.

32. The system according to claim 20, further comprising a node management service coupled to said enterprise messaging system, said node management service providing start, stop, and update functionality to said system.

33. The system according to claim 20, wherein said computer applications are geographically distributed.

34. An agent-adapter for use in an enterprise application integration system, which integrates a plurality of enterprise applications, comprising:

an adapter configured for a selected one of the enterprise applications;

an agent service hosting said adapter;

a message definition for each of a plurality of messages said adapter will produce, receive, or reply to;

means for connecting said adapter to said selected enterprise application; and means for implementing said adapter through said connecting means.

35. The agent-adapter according to claim 34, wherein said adapter comprises a reply adapter and further comprising means for designating selected ones of a plurality of requesters to which said reply adapter is adapted to send one or more reply messages.

36. The agent-adapter according to claim 35, wherein each said requester comprises a transformer.

37. The agent-adapter according to claim 34, further comprising means for designating selected ones of a plurality of delivery options for messages associated with said adapter.

38. The agent-adapter architecture according to claim 37, wherein said plurality of delivery options includes a parameter indicative of a lifetime for each said associated message.

39. The agent-adapter according to claim 34, wherein said adapter is selected from the group consisting of a source adapter, a target adapter, and a reply adapter.

40. The agent-adapter according to claim 34, wherein said adapter comprises a source adapter and further comprising means for designating selected ones of a plurality of targets said source adapter is adapted to send one or more messages.

41. The agent-adapter according to claim 34, wherein said adapter comprises a target adapter and further comprising means for designating selected ones of a plurality of sources from which said target adapter is adapted to receive one or more messages.

42. The agent-adapter according to claim 34, wherein said implementation means further comprises means for extracting said message definition of said adapter.

43. A computer-readable medium embodying code segments for integrating a plurality of computer applications, the code segments comprising:

a first code segment for passing a plurality of messages between the plurality of computer applications;

a second code segment for performing data transformation of messages;

a third code segment for applying rules to messages;

a plurality of fourth code segments, each fourth code segment for passing messages between respective computer applications and said first code segment.

44. The computer-readable medium according to claim 43, further comprising means for designating selected ones of the plurality of computer applications as a source application or a target application.

45. The computer-readable medium according to claim 44, wherein said adapting means further comprises:

means for adapting to said ones of the plurality of computer applications selected as a source application; and means for adapting to said ones of the plurality of computer applications selected as a target application.

46. The computer-readable medium according to claim 44, wherein said adapting means further comprises means for adapting to a plurality of reply messages sent from said target applications.

47. The computer-readable medium according to claim 43, wherein said first code segment comprises means for adapting each of said plurality of messages to a respective one of the plurality of computer applications.

48. The computer-readable medium according to claim 43, further comprising:

a fifth code segment of data transformation configurations; and a sixth code segment of business process rules.

49. A method for passing messages between a first computer application and a second computer application, comprising the steps of:

providing an adapter configured for a selected one of said computer applications;

providing an agent service to host said adapter;

defining a message definition for each of a plurality of messages said adapter will produce receive or reply to;

connecting said adapter to the selected computer application;

providing a first message having a first data from said first computer application;

publishing said first message to obtain a first published message;

converting said first data of said first published message to a second data to obtain a second message;

publishing said second message to obtain a second published message; and providing said second published messaged to said second computer application.

50. The method according to claim 49, further comprising the steps of:

translating said first message from a first computer application format to a system format prior to publishing said first message; and translating said second published message from said system format to a second computer application format prior to providing said second published message to said second computer application.

51. The method according to 49, wherein said step of converting said first data comprises:

requesting said second data from a database; and receiving said second data from said database.

* * * * *